US010052978B2

(12) United States Patent
Noguchi et al.

(10) Patent No.: US 10,052,978 B2
(45) Date of Patent: Aug. 21, 2018

(54) SEAT RECLINING APPARATUS FOR VEHICLE

(71) Applicant: AISIN SEIKI KABUSHIKI KAISHA, Kariya-shi (JP)

(72) Inventors: Masao Noguchi, Kariya (JP); Hideo Nihonmatsu, Anjo (JP); Yasuhiro Kojima, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/528,284

(22) PCT Filed: Sep. 29, 2015

(86) PCT No.: PCT/JP2015/077542
§ 371 (c)(1),
(2) Date: May 19, 2017

(87) PCT Pub. No.: WO2016/084471
PCT Pub. Date: Jun. 2, 2016

(65) Prior Publication Data
US 2017/0327010 A1 Nov. 16, 2017

(30) Foreign Application Priority Data

Nov. 26, 2014 (JP) .................................. 2014-239373
Nov. 26, 2014 (JP) .................................. 2014-239374

(51) Int. Cl.
*B60N 2/235* (2006.01)

(52) U.S. Cl.
CPC .................................. *B60N 2/2358* (2013.01)

(58) Field of Classification Search
CPC .................................................. B60N 2/2358
(Continued)

(56) References Cited

U.S. PATENT DOCUMENTS 8,864,234 B2 * 10/2014 McCulloch .......... B60N 2/2358
297/367 P
9,073,458 B2 * 7/2015 Kojima ................ B60N 2/2358
(Continued)

FOREIGN PATENT DOCUMENTS

JP 2006-150035 A 6/2006

OTHER PUBLICATIONS

International Preliminary Report on Patentability and Written Opinion dated May 30, 2017 in PCT/JP2015/077542 (submitting English translation only).
(Continued)

*Primary Examiner* — Anthony D Barfield
(74) *Attorney, Agent, or Firm* — Oblon, McClelland, Maier & Neustadt, L.L.P.

(57) ABSTRACT

By a contact of an engagement portion of a second memory member to a circumferential wall portion of a first memory member, the engagement portion is restricted from moving in a radial direction in accordance with a lock operation of lock members. By an engagement of the circumferential wall portion of the first memory member with the engagement portion of the second memory member that is in contact with the circumferential wall portion, the first memory member integrally rotates with a first rotary member on a same axis of the first and second rotary members. In a state where a rotation limiting mechanism restricts the first memory member and the first rotary member from integrally rotating with each other, the first memory member allows the engagement portion to slide along a longitudinal direction of the circumferential wall portion.

14 Claims, 12 Drawing Sheets

(58) Field of Classification Search
USPC .................................................. 297/378.1
See application file for complete search history.

(56) References Cited

U.S. PATENT DOCUMENTS

| | | | |
|---|---|---|---|
| 9,849,811 B2* | 12/2017 | Kojima | B60N 2/2358 |
| 2005/0082892 A1* | 4/2005 | Yamada | B60N 2/20 |
| | | | 297/367 R |
| 2006/0091712 A1 | 5/2006 | Tokui et al. | |
| 2011/0127821 A1* | 6/2011 | Wojatzki | B60N 2/2358 |
| | | | 297/354.12 |

OTHER PUBLICATIONS

International Search Report dated Dec. 28, 2015 in PCT/JP2015/077542 filed Sep. 29, 2015.

* cited by examiner

Inward in seat width direction

Outward in seat width direction

When forward inclination is operated

When pulling up
operation is started

When initial position reaches

When basic position is returned

SEAT RECLINING APPARATUS FOR VEHICLE

TECHNICAL FIELD

The present invention relates to a seat reclining apparatus for a vehicle.

BACKGROUND ART

A seat reclining apparatus for a vehicle configured to retain a seatback in an unlock state where the seat back is released from being locked by a recliner at a predetermined inclination angle range is known. By a provision of a retention mechanism, an inclination angle of the seatback may be largely changed without maintaining an unlock operation input. In addition, the seat reclining device includes an operation input portion, for switching the recliner to the unlock state, disposed at an operable position from a backward of the seatback.

For example, a seat reclining device disclosed in Patent document 1 includes a forward inclination operation lever provided at an upper end of a seatback, and a link lever rotating on a basis of an operation input of the forward inclination operation lever. A recliner is shifted to an unlock state by rotating the link lever. In addition, the seat reclining device includes a cam plate that may restrict the link lever from rotating. The cam plate restricts the link lever from rotating by engaging with the link lever that rotates in conjunction with the forward inclination operation lever. The cam plate is retained in an engaged state with respect to the link lever at a predetermined inclination angle range that is set forward of a neutral position corresponding to a basic position of the seatback.

The seatback reclining apparatus of the known example may largely incline the seatback forward without maintaining the operation input relative to the forward inclination operation lever based on the engagement relationship between the link lever and the cam plate. The seat reclining device may return the seatback to a fixed point that corresponds to the basic position of the seatback irrespective of an inclination angle before the forward inclination operation by pulling up the seatback.

The seat reclining apparatus of the known example includes a reclining operation lever that is separately provided from the link lever and the cam plate with which a retention mechanism is configured. The reclining operation lever is provided at a side of the seat cushion. The reclining operation lever may adjust the inclination angle of the seatback at the forward of the basic position of the seatback by unlocking the recliner based on the operation input relative to the reclining operation lever.

However, there is a case where only one operation system of the seatback is set in a seat for a vehicle, for example, a rear seat. In this case, according to the aforementioned known technology, the return position by the pulling up operation may accord with a first stage position of an adjustable range of the inclination angle of the seatback.

DOCUMENT OF PRIOR ART

Patent Document

Patent document 1: JP2006-150035A

OVERVIEW OF INVENTION

Problem to be Solved by Invention

An object of the present invention is to provide a seat reclining apparatus for a vehicle that may adjust an inclination angle by a single operation system, that may return a seat to a fixed point by a pulling up operation, and that may include high flexibility for setting the return position.

Means for Solving Problem

To solve the aforementioned problem, according to the first mode of the present invention, a seat reclining apparatus for a vehicle includes a first rotary member, a second rotary member being coaxially disposed on the first rotary member so as to be relatively movable therewith, a lock member restricting the first rotary member and the second rotary member from relatively rotating with each other, an operation mechanism locking and unlocking the lock member, a first memory member being coaxially provided with the first rotary member and the second rotary member so as to be rotatable therewith, a second memory member integrally rotating with the first rotary member in a state of being connected to the operation mechanism, and a rotation limiting mechanism limiting a rotary range of the first memory member relative to the second rotary member. The first memory member includes a first engagement portion extending in a circumferential direction of the first memory member, the second memory member includes a second engagement portion moving in conjunction with a lock operation and an unlock operation of the lock member, the first memory member restricts a movement of the second engagement portion, the movement that follows the lock operation of the lock member, by a contact of the first engagement portion and the second engagement portion, the first memory member integrally rotates with the first rotary member by an engagement of the second engagement portion being in contact with the first engagement portion with the first engagement portion, and in a state where the rotation limiting mechanism restricts the first memory member and the first rotary member from integrally rotating with each other, the first memory member allows the second engagement portion to slide along a longitudinal direction of the first engagement portion.

MODE FOR CARRYING OUT THE INVENTION

Figure 1:
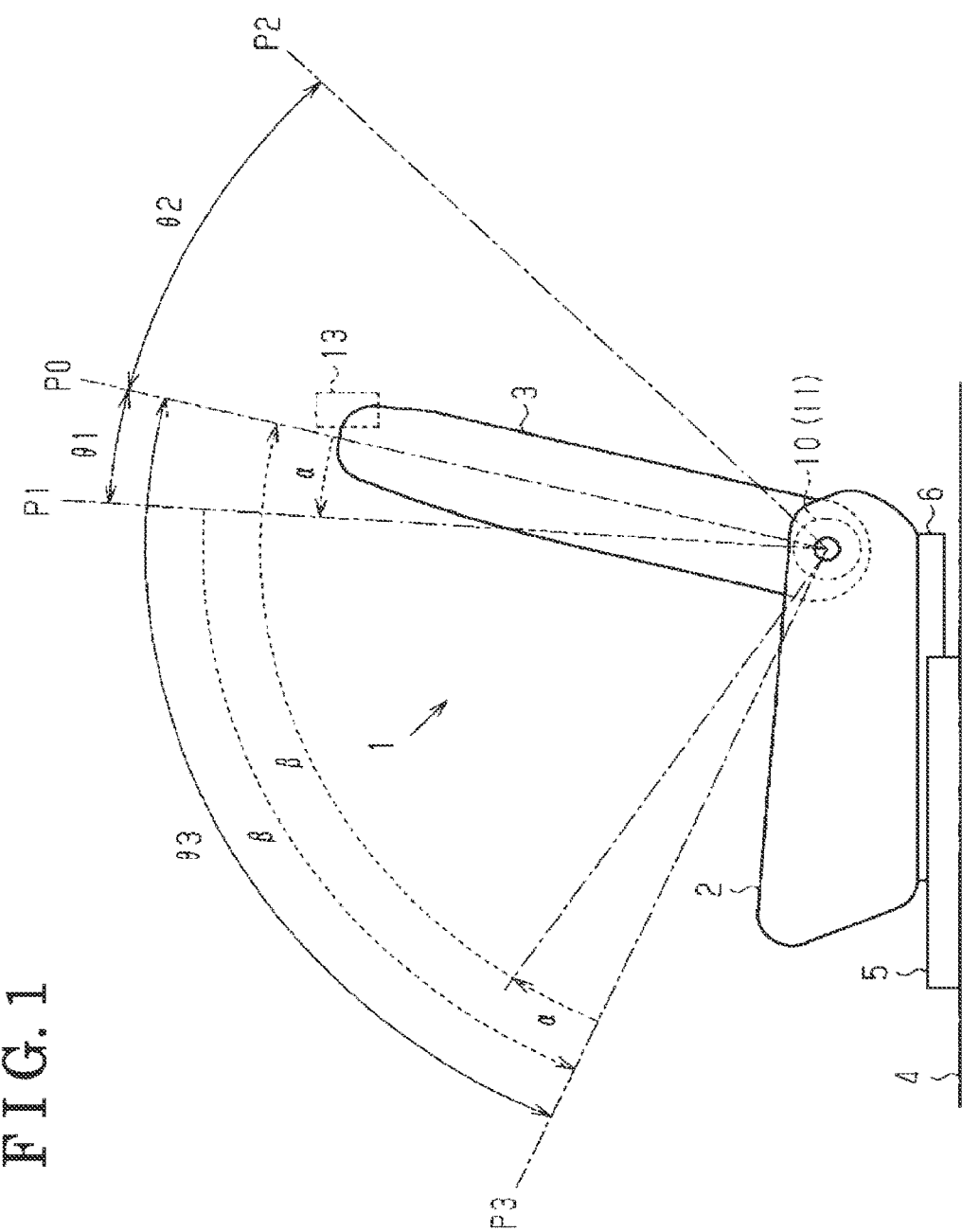
FIG. 1 is a side view of a seat for a vehicle being provided with a seat reclining apparatus.

An embodiment of a seat reclining apparatus of a present invention will hereunder be explained in accordance with the drawings. As shown in FIG. 1, a seat 1 for a vehicle includes a seat cushion 2 and a seat back 3 provided so as to be inclinable with respect to a rear end of the seat cushion 2. The seat 1 is used as a rear seat of the vehicle. A floor portion 4 of the vehicle includes a right-and-left pair of lower rails 5 and a right-and-left pair of upper rails 6. The upper rail 6 moves on the lower rail 5 in a longitudinal direction of the lower rail 5. The seat 1 is disposed so as to be adjustable of a position in a front-rear direction by being supported on the upper rail 6. The seat 1 is provided with a seat reclining apparatus 10 which can adjust an inclination angle of the seatback 3.

As illustrated in FIGS. 2 to 6, a recliner 11 is disposed between the seat cushion 2 and the seatback 3. The recliner 11 restricts the seatback 3 from rotating with respect to the seat cushion 2, and allows the seatback 3 to rotate. As illustrated in FIG. 1, an operation lever 13 is provided at an upper end of the seatback 3. A passenger of the vehicle may adjust the inclination angle of the seatback 3 based on the function of the recliner 11 by operating the operation lever 13.

Figure 2:
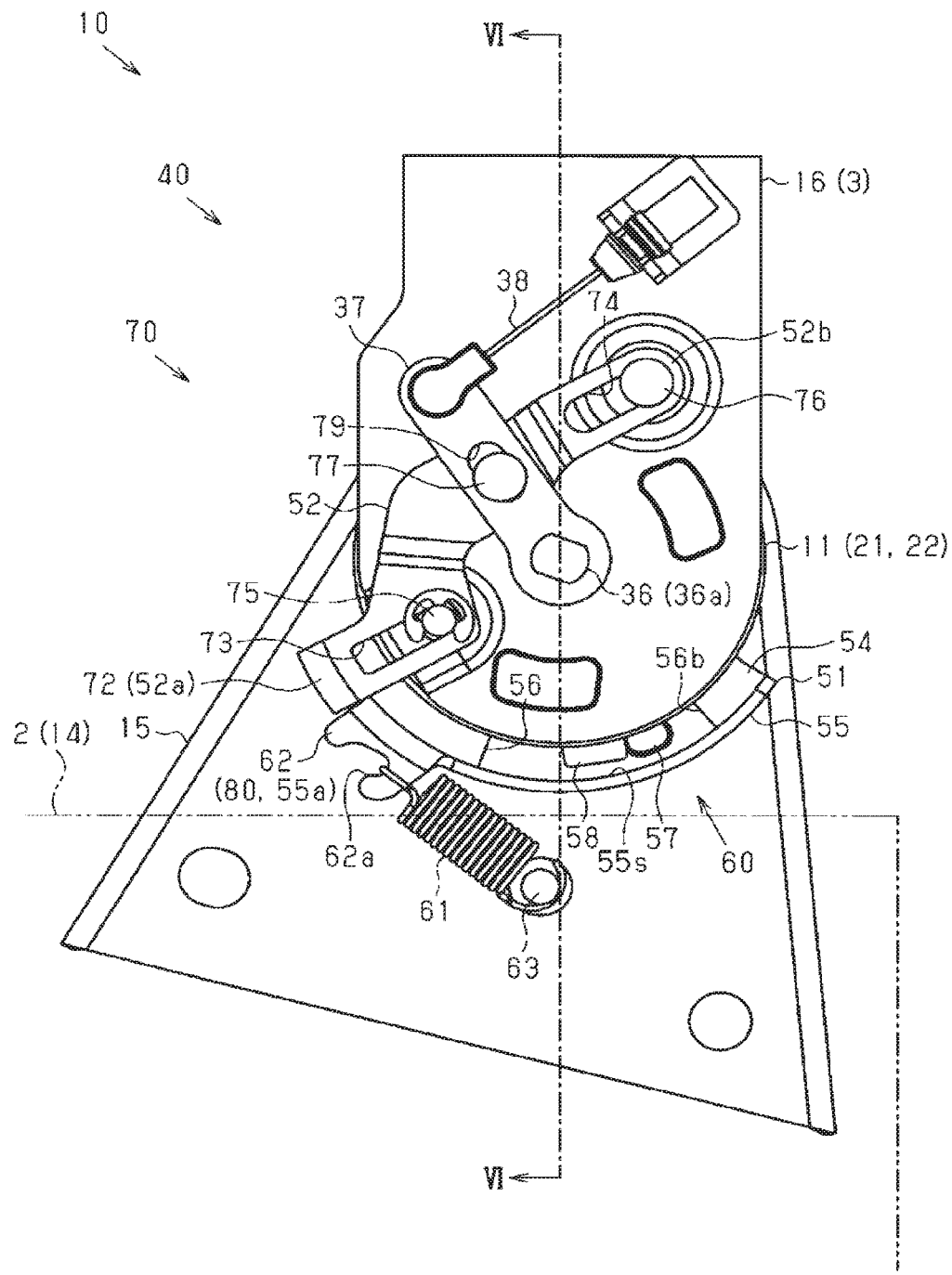
FIG. 2 is a side view of the seat reclining apparatus in which a seatback is disposed at a first stage portion before a forward inclination operation.
Figure 3:
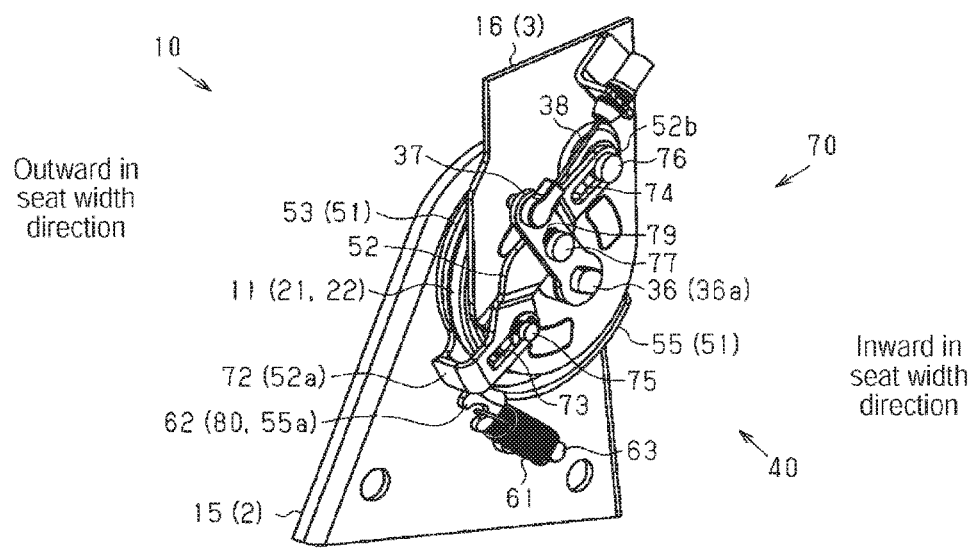
FIG. 3 is a perspective view of the seat reclining apparatus.
Figure 4:
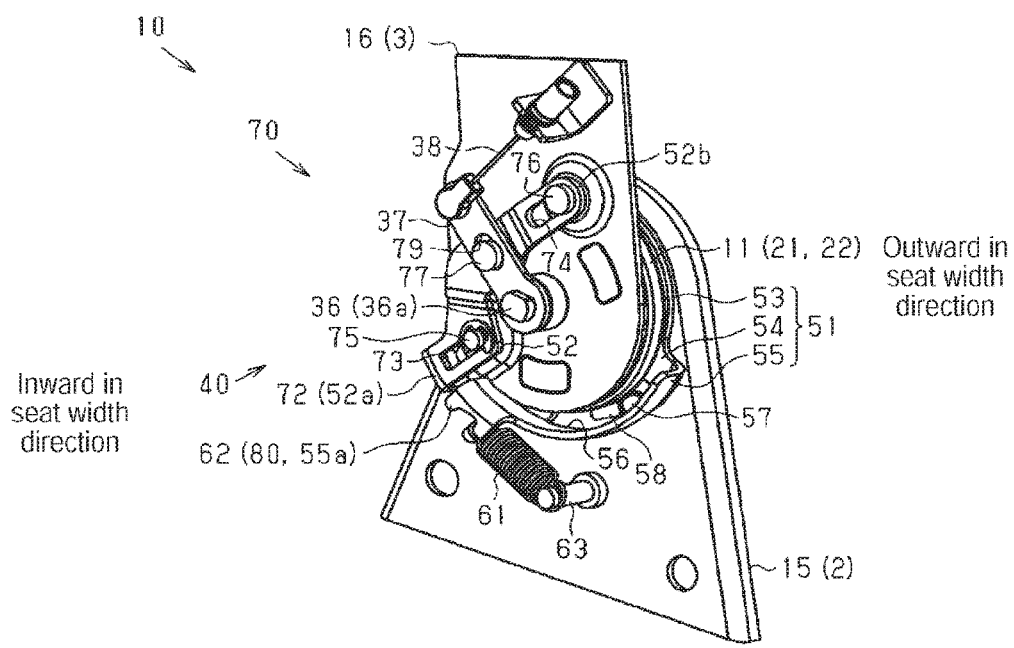
FIG. 4 is another perspective view of the seat reclining apparatus.

As illustrated in FIG. 2, a support plate 15 serving as a plate-shaped member extends upward from a rear end of a side frame 14 forming a framework of the seatback 3. Seatback side members 16 forming the framework of the seat back 3 are disposed inner sides of the support plates 15 provided at opposing portions of the seat cushion 2. The recliners 11 are disposed at opposing sides of the seatback 3 in a manner of each being sandwiched by an upper end of the support plate 15 and a base end of the seatback side member 16 opposing each other in a seat width direction.

Figure 6:
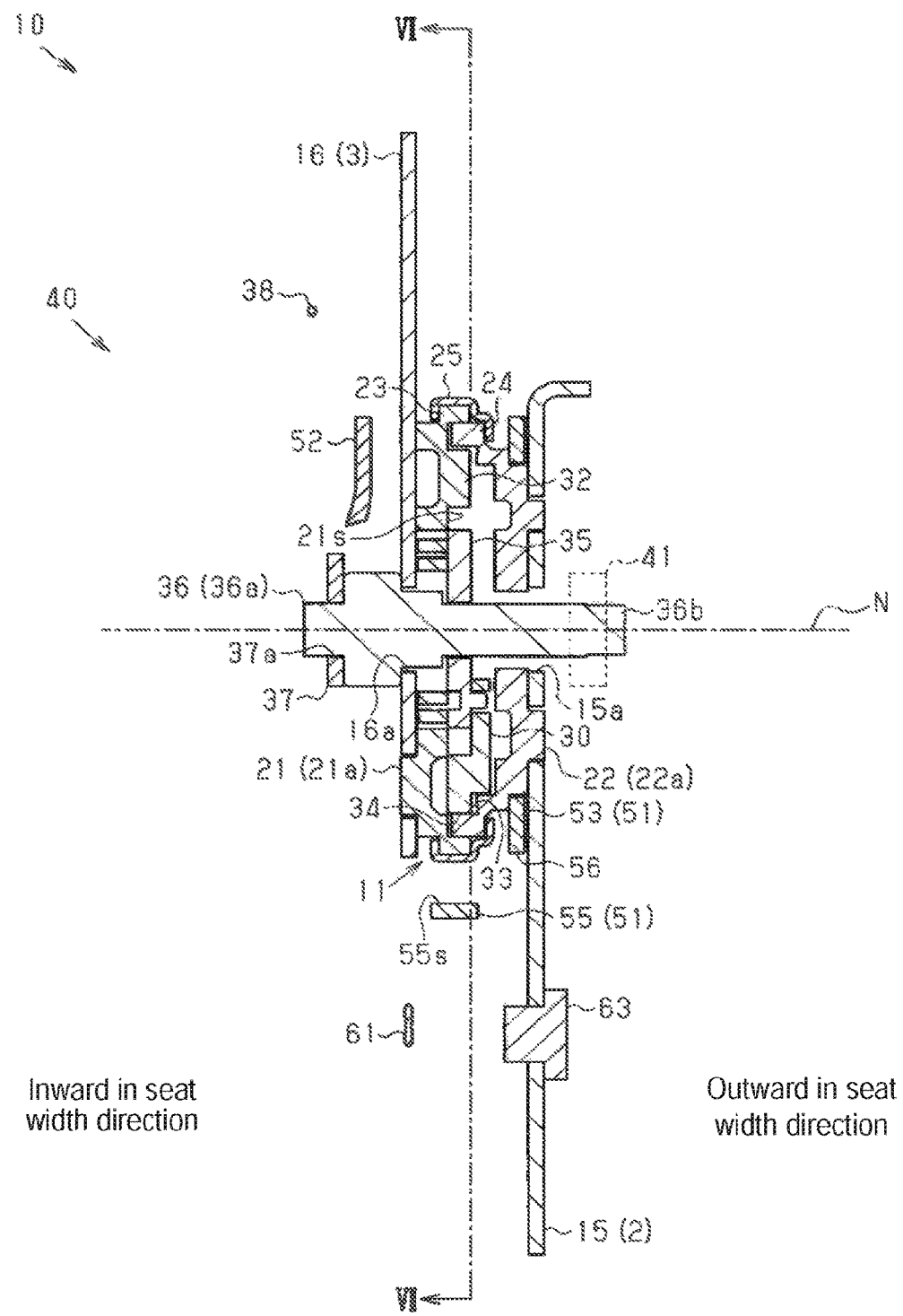
FIG. 6 is a cross sectional view taken along a line VI-VI in FIG. 2.
Figure 7:
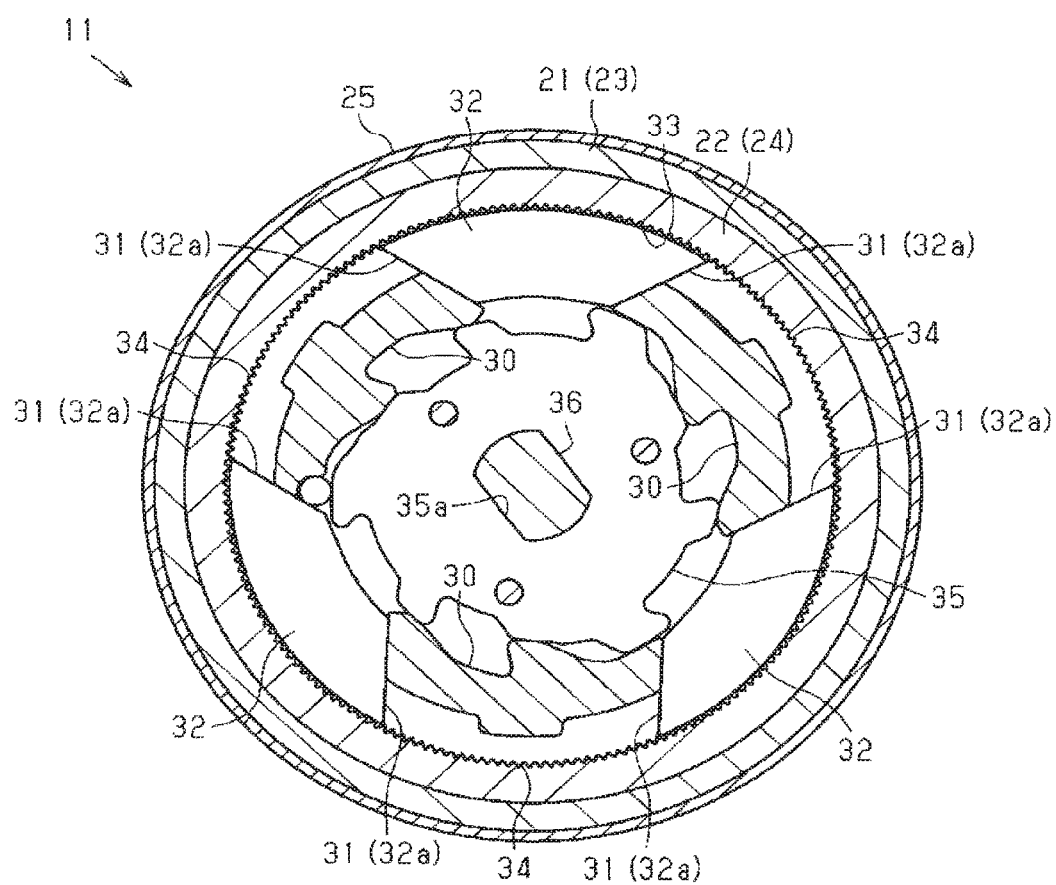
FIG. 7 is a cross sectional view taken along a line VII-VII in FIG. 6.

As illustrated in FIGS. 6 and 7, the recliner 11 includes first and second rotary members 21, 22 (a lower bracket and an upper bracket) disposed so as to be relatively rotatable therewith by including a common rotary shaft N.

The first and second rotary members 21, 22 are both formed in a substantially disc shape. Each of peripheries of the first and second rotary members 21, 22 is formed with ring-shaped circumferential wall portions 23, 24, respectively. The circumferential wall portion 23 of the first rotary member 21 protrudes from a main body portion 21a of the first rotary member 21 toward the second rotary member 22. A peripheral wall portion 24 of the second rotary member 22 protrudes from a main body portion 22a of the second rotary member 22 toward the first rotary member 21. By the fitting of the peripheral wall portions 23, 24, the first and second rotary members 21, 22 are coaxially disposed so as to be relatively rotatable therewith.

An inner diameter of the peripheral wall portion 23 of the first rotary member 21 is substantially the same as an outer diameter of the peripheral wall portion 24 of the second rotary member 22. According to this configuration, the first and second rotary members 21, 22 are relatively rotatably assembled in a state where the peripheral wall portions 23, 24 are slidably in contact with each other in a radial direction.

The recliner 11 includes a ring-shaped holder 25. The ring-shaped holder 25 includes a cross section in which the peripheral wall portion 23 of the first rotary member 21 and the peripheral wall portion 24 of the second rotary member 22 are sandwiched by the ring-shaped holder 25 in a thickness direction (a right-left direction in FIG. 6). Being fitted onto the outer peripheries of the first and second rotary members 21, 22, the ring-shaped holder 25 allows the relative rotation of the first and second rotary members 21, 22 and restricts the relative movement of the first and second rotary members 21, 22 along the rotary shaft N.

As illustrated in FIG. 6, the first rotary member 21 is fixed on a base end of the seatback side member 16 of the seatback 3, and the second rotary member 22 is fixed on an upper end of the support plate 15 of the seat cushion 2. Pawls 30 serving as three lock members are disposed between the first and second rotary members 21, 22. The pawls 30 restrict the first and second rotary members 21, 22 from rotating relatively by engaging with the both of the first and second rotary members.

As illustrated in FIG. 7, the first rotary member 21 includes guide portions 31 retaining the lock members 30 so as to be movable in the radial direction at an inner side of the peripheral portion 23 in the radial direction. As illustrated in FIGS. 6 and 7, the lock members 30 are formed in a plate shape. The first rotary member 21 includes a facing surface 21s (a left surface in FIG. 6) facing the second rotary member 22. The facing surface 21s of the first rotary member 21 is formed with three retaining protrusions 32. The retaining protrusions 32 are disposed so as to be equally spaced apart from one another in the circumferential direction. Each of the retaining protrusion 32 is formed in a substantially fan shape. Accordingly, all side wall portions 32a that are adjacent to each other in the circumferential direction are substantially in parallel with each other. Each of the lock members 30 is disposed between the retaining protrusions 32 that are adjacent to each other.

That is, the side wall portion 32a of the retaining protrusion 32 functions as the guide portion 31 by sandwiching the lock member 30 between the side wall portions 32a of the retaining protrusions 32 that are adjacent to each other in the circumferential direction. The lock member 30 is retained so as to be movable in the radial direction in a state of being slidably in contact with the side wall portion 32a of the retaining protrusion 32 that are adjacent to each other in the circumferential direction. The lock member 30 is retained by the first rotary member 21 in a state of being restricted from moving relatively in the circumferential direction by coming in contact with the side wall portion 32a.

As illustrated in FIG. 7, the peripheral wall portion 24 of the second rotary member 22 is formed with inner teeth 33 protruding in a radially inward direction over the entire range of an inner periphery formed in a ring shape. In addition, outer teeth 34 that can mesh with the inner teeth 33 of the peripheral wall portion 24 of the second rotary member 22 are formed at a distal end of the lock member 30 that is disposed at the outer side in the radial direction in a state of being retained by the first rotary member 21. Since the outer teeth 34 of the lock member 30 mesh with the inner teeth 33 of the second rotary member 22, the first rotary member 21 that retains the lock member 30 and the second rotary member 22 are restricted from rotating relatively.

As illustrated in FIGS. 6 and 7, the recliner 11 includes a cam member 35 provided inward of the lock member 30 in the radial direction. The cam member 35 is formed in a substantially plate shape. The cam member 35 is coaxially disposed on the first and second rotary members 21, 22 and is rotatable therewith. The cam member 35 is disposed inward of the lock member 30 in the radial direction in a state where a peripheral rim of the cam member 35 is in contact with a proximal end of the lock member 30.

Each of the lock members 30 moves in the radial direction by the rotation of the cam member 35. Accordingly, the outer teeth 34 of the lock member 30 are disengaged from the inner teeth 33 of the peripheral wall portion 24 of the second rotary member 22.

The cam member 35 moves the lock members 30 in the radial outward direction by rotating in the clockwise direction in FIG. 7 with respect to the first rotary member 21 retaining the lock members 30. Accordingly, by the meshing of the outer teeth 34 of the lock member 30 and the inner teeth 33 of the second rotary member 22, the recliner 11 locks the first and second rotary members 21, 22 so as not to be relatively rotatable and switches to the lock state where the inclination angle of the seatback 3 relative to the seat cushion 2 is fixed.

Meanwhile, the cam member 35 rotates in the anticlockwise direction in FIG. 7 to move the lock member 30 in the radially inward direction. Accordingly, by the disengagement of the outer teeth 34 of the lock member 30 from the inner teeth 33 of the second rotary member 22, the recliner 11 allows the first and second rotary members 21, 22 to relatively rotate with each other and switches to the unlock state where the inclination angle of the seatback 3 is adjustable.

Figure 5:
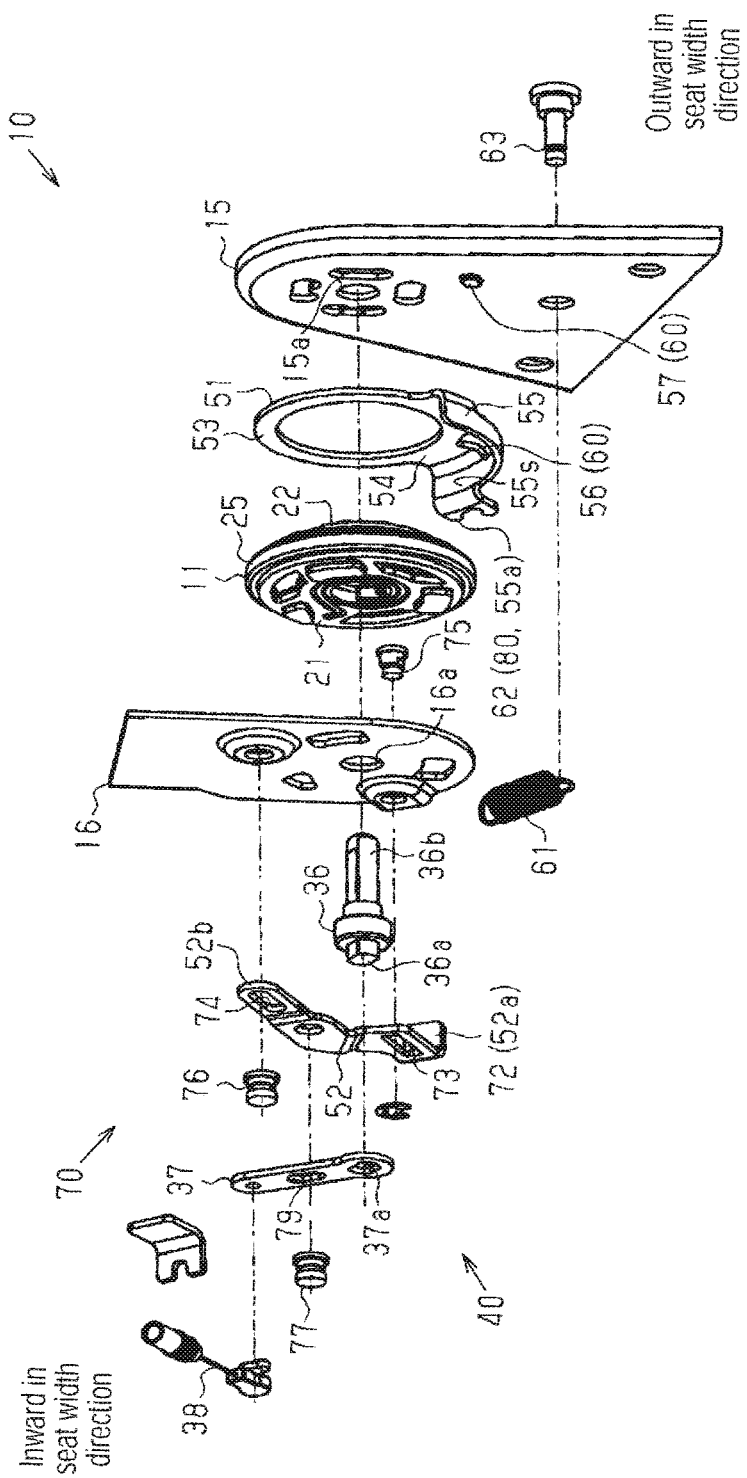
FIG. 5 is an exploded perspective view of the seat reclining apparatus.

As illustrated in FIGS. 5 to 7, the seat reclining apparatus 10 includes an operation shaft 36 penetrating the recliner 11 and the cam member 35 in the thickness direction thereof. The operation shaft 36 is formed in a width across flat shape and includes a pair of flat surface portions that are in parallel with each other. The cam member 35 is formed with a fitting hole 35a. The fitting hole 35a is formed in a width across flat shape that corresponds to the shape of the operation shaft 36. The cam member 35 is fixed to the operation shaft 36 so as to be unrotatable by the operation shaft 36 that is inserted into the fitting hole 35a. Accordingly, the cam member 35 integrally rotates with the operation shaft 36 on the same axis of the first and second rotary members 21, 22.

As illustrated in FIGS. 2 to 6, the seat reclining apparatus 10 includes a lever member 37 fixed to the operation shaft 36. The lever member 37 integrally rotates with the operation shaft 36. The lever member 37 is fixed to a first end portion 36a of the operation shaft 36 penetrating the recliner 11, the first end portion 36a that is disposed at a side where the first rotary member 21 is disposed. Accordingly, the lever member 37 is disposed at a position inwardly in the seat width direction (a front side in FIG. 2 and left side in FIG. 6) relative to the seatback side member 16 to which the first rotary member 21 is fixed. The seatback side member 16 is formed with a fitting hole 16a into which the operation shaft 36 is inserted. A fitting hole 37a that is formed in a similar shape of the fitting hole of the cam member 35 is formed at a proximal end of the lever 37. By the insertion of the first end portion 36a of the operation shaft 36 into the fitting hole 37a, the lever 37 is unrotatably fixed to the first end portion 36a of the operation shaft 36.

Furthermore, the seat reclining apparatus 10 includes a wire cable 38 connecting a distal end of the lever member 37 to the operation lever 13. The seat reclining apparatus 10 includes an operation mechanism 40 locking and unlocking the lock members 30 based on the operation input by the operation lever 13.

When the operation lever 13 operates, the lever member 37 connected to the operation shaft 36 rotates in the clockwise direction in FIG. 2 by being pulled up by the wire cable 38. By the rotation of the lever member 37, the cam member 35 connected to the lever member 37 via the operation shaft 36 rotates in the anticlockwise direction in FIG. 7. Accordingly, the lock member 30 performs the unlock operation to allow the relative rotation of the first and second rotary members 21, 22 and to switch the inclination angle of the seatback 3 to the adjustable unlock state.

Furthermore, the seatback reclining apparatus 10 includes a torsion coil spring 41 into which the operation shaft 36 is fittingly inserted. The support plate 15 is formed with an insertion hole 15a into which a second end portion 36b of the operation shaft 36 is inserted. The operation shaft 36 is fittingly inserted inside of the torsion coil spring 41 at an outward in the seat width direction relative to the support plate 15. The operation shaft 36 is biased in a direction in which the lock member 30 performs the lock operation by an elastic restoring force of the torsion coil spring 41.

That is, when the operation input by the operation lever 13 is disconnected, that is, when a user releases his/her hand from the operation lever 13, the operation shaft 36 rotates in the clockwise direction in FIG. 7 on a basis of the elastic force of the torsion coil spring 41. Accordingly, by the lock operation of the lock member 30, the first and second rotary members 21, 22 are restricted from relatively rotating with each other and are switched to the lock state where the inclination angle of the seatback 3 is fixed.

As illustrated in FIG. 1, the seat reclining apparatus 10 may change and fix the inclination angle of the seatback 3 within a range of an inclination angle θ1 in which the seatback 3 inclines forward based on a preset basic position (neutral position) P0 and an inclination angle θ2 in which the seatback 3 inclines backward based on the preset basic position (neutral position) P0.

The seat reclining apparatus 10 may incline the seatback 3 up to a maximum inclination position P3 where the seatback 3 is further inclined by an inclination angle θ3 beyond a forward first step position P1 (the upright position) where the inclination angle of the seatback 3 is adjustable. According to the present embodiment, the maximum forward inclination position P3 and the maximum rear inclination position P2 of the seatback 3 are preset by stoppers which are not illustrated. In a forward inclination range that is beyond the first stage position P1, the recliner 11 is maintained in the unlock state and the inclination angle of the seatback 3 is not fixed even though the operation input is not maintained by the operation lever 13. In addition, the seat reclining apparatus 10 includes a fixed point return function that can return the seatback 3 to the basic position P0 irrespective of the inclination angle before the forward inclination operation by pulling up the seatback 3 that operates the forward inclination operation relative to the first stage portion P1.

Next, the fixed point return function by the pulling up operation that is employed in the seat reclining apparatus 10 will be explained. As illustrated in FIGS. 2 to 6, the seat reclining apparatus 10 includes a first memory member 51 and a second memory member 52. The first memory member 51 is coaxially provided on the first and second rotary members 21, 22. The second memory member 52 integrally rotates with the first rotary member 21 in a state of being connected to the lever member 37.

Figure 8:
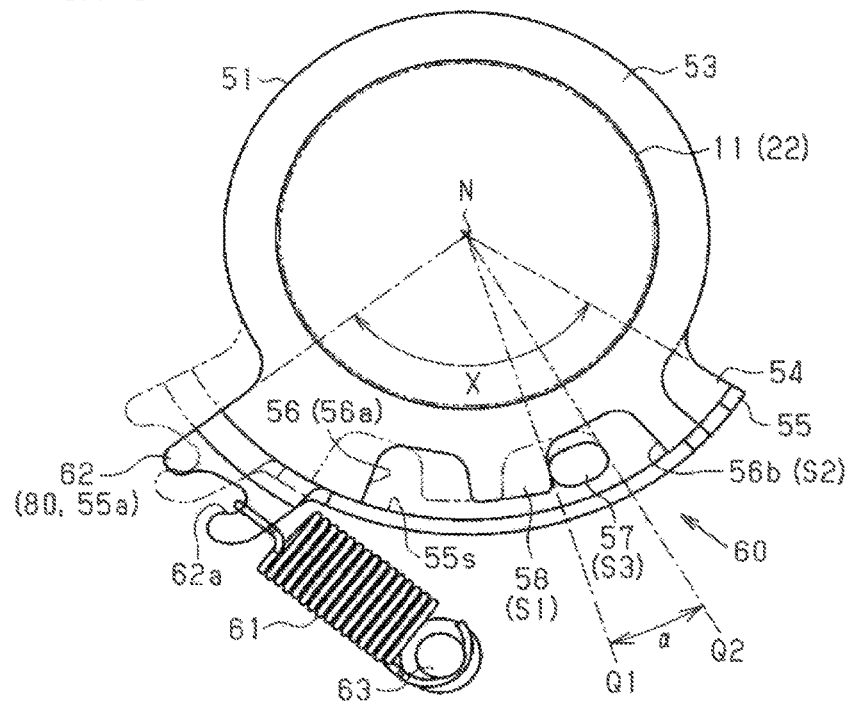
FIG. 8 is a plan view of a first memory member and a rotation limiting mechanism.

As illustrated in FIG. 8, the first memory member 51 includes a fitting portion 53 formed in a substantially ring shape, an extended portion 54 extending in an radially outward direction from a peripheral rim of the fitting portion 53, and a circumferential wall portion 55 provided at a peripheral rim of the extended portion 54. The first memory member 51 is formed such that a deforming process (pressing process) is performed on a plate material. As illustrated in FIGS. 2 to 6, the first memory member 51 is rotatably supported relative to the first and second rotary members 21, 22 by fitting the fitting portion 53 to an outer circumference of the second rotary member 22. The circumferential wall portion 55 of the first memory member 51 is disposed at an outer side of the recliner 11 in the radial direction.

As illustrated in FIGS. 2 and 8, the extended portion 54 is formed with an elongated hole 56 extending in a circumferential direction of the first memory member 51. In addition, the second rotary member 22 is fixed on the support plate 15 in a state of being fittingly fixed to the first memory member 51 at the outer periphery of the second rotary member 22. The support plate 15 includes a restricting protrusion 57 being inserted into the elongated hole 56 of the extended portion 54. The first memory member 51 is rotatable relative to the second rotary member 22 in a range where the restricting protrusion 57 is movable within the elongated hole 56.

The first memory member 51 is formed with an engagement protrusion 58 protruding toward the elongated hole 56. The engagement protrusion 58 is formed at a substantially intermediate position of the elongated hole 56 in the longitudinal direction. In a state where the first memory member 51 is fitted on the outer circumference of the second rotary member 22, the restricting protrusion 57 within the elongated hole 56 is disposed at a rear relative to the engagement protrusion 58 (right in FIG. 2).

As illustrated in FIG. 8, first and second rotary restrictions S1, S2 constitute the engagement protrusion 58 and a rear end 56b of the elongated hole 56, respectively. A third restriction portion S3 constitutes the restriction protrusion 57. A rotation limiting mechanism 60 limits a rotary range of the first memory member 51 relative to the second rotary member 22 between a first rotary position Q1 where the third rotation restricting portion S3 comes in contact with the first rotation restricting portion S1, and a second rotary position Q2 where the third rotation restricting portion S3 comes in contact with the second rotation restricting portion S2.

As illustrated in FIGS. 2 and 8, the seat reclining apparatus 10 includes a stretching coil 61 serving as a biasing member biasing the first memory member 51 in the anticlockwise direction in FIGS. 2, and 8. The first memory member 51 includes a flange portion 62 extending outwardly in the radial direction at a front end 55a of the circumferential wall portion 55 in the circumferential direction. A shaft-shaped locking pin 63 is mounted to the support plate 15 at a rear position relative to the flange portion 62. End portions of the stretching coil 61 are locked at a locking portion 62a of the flange portion 62 and by the locking pin 63, respectively. Accordingly, the stretching coil spring 61 biases the first memory member 51 in the anticlockwise direction based on its elasticity restoring force.

As illustrated in FIG. 8, the first memory member 51 rotates relative to the second rotary member 22 based on the biasing force of the stretching coil spring 61. Accordingly, the restricting protrusion 57 being mounted on the support plate 15 comes in contact with the engagement protrusion 58 within the elongated hole 56. The seat reclining apparatus 10 is configured to retain the first memory member 51 at the first rotary position Q1 where the engagement protrusion 58 serving as the first rotation restricting portion S1 and the restricting protrusion 57 serving as the third rotation restricting portion S3 come in contact with each other.

Figure 9:
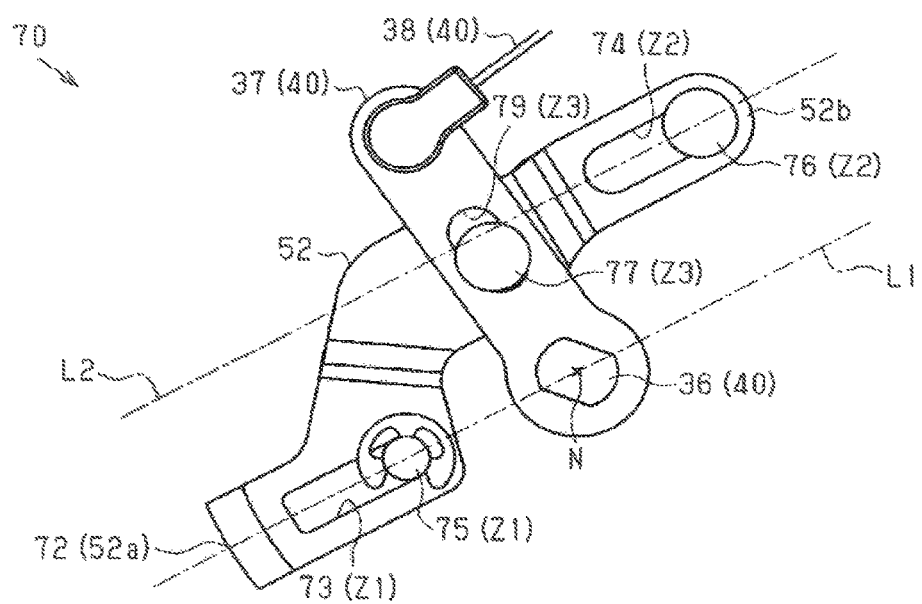
FIG. 9 is a plan view of a lever member and a second memory member.
Figure 10:
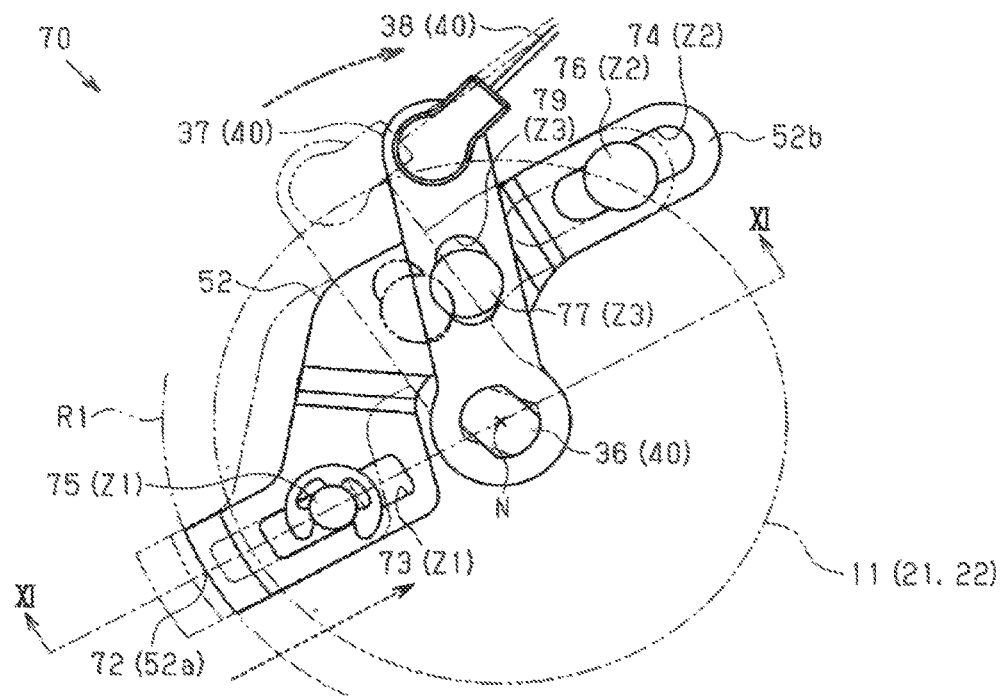
FIG. 10 is a plan view explaining a movement of the lever member and the second memory member.

As illustrated in FIGS. 9 and 10, the second memory member 52 forms a link mechanism 70 by being connected to the lever member 37. Accordingly, an engagement portion 72 of a first end portion 52a of the second memory member 52 moves in the radial direction in conjunction with the lock operation and the unlock operation of each of the lock members 30.

The second memory member 52 is formed in a plate shape and a substantially crank shape such that a deforming process (pressing process) is performed on a plate material. The engagement portion 72 is formed by bending the first end portion 52a of the second memory member 52. The second memory member 52 is connected to the first rotary member 21 in a state where the engagement portion 72 is disposed at an outer side of the recliner 11 in the radial direction.

As illustrated in FIG. 9, the second memory member 52 includes elongated holes 73, 74 adjacent to the first end portion 52a and the second end portion 52b, respectively. The elongated holes 73, 74 extend along two straight lines L1, L2, respectively, that are in parallel with each other. As illustrated in FIGS. 2 to 5, the seatback side member 16 is provided with shaft-shaped connection pins 75, 76 which are inserted into the elongated holes 73, 74, respectively. As illustrated in FIG. 10, the second memory member 52 is connected to the first rotary member 21. The second memory member 52 is movable in the longitudinal direction of the elongated holes 73, 74, and is integrally rotatable with the first rotary member 21 with which the connection pins 75, 76 are provided.

As illustrated in FIG. 9, by the insertion of the connection pins 75, 76 into the elongated holes 73, 74, respectively, the second memory member 52 is disposed such that the longitudinal direction of the elongated hole 73 matches the straight line L1 passing a rotary axis N of the first and second rotary members 21, 22. Accordingly, the second memory member 52 is disposed such that the engagement portion 72 moves along the straight line L1 in the radial direction.

The second memory member 52 includes a shaft-shaped connection pin 77 at an intermediate position between the elongated holes 73, 74. An elongated hole 79 extending in the longitudinal direction of the lever member 37 is formed at the lever member 37. Since the connection pin 77 is inserted into the elongated hole 79 of the lever member 37, the second memory member 52 is connected to the lever member 37.

According to the present embodiment, first and second connection portions Z1, Z2 connecting the seatback side member 16 and the second memory member 52 are formed by the insertion of the connection pins 75, 76 into the elongated holes 73, 74 of the second memory member 52. In addition, the third connection portion Z3 connecting the lever member 37 and the second memory member 52 is formed by the insertion of the connection pin 77 into the elongated hole 79 of the lever member 37. Furthermore, since the connection pins 75, 76, 77 serving as guide engagement portions constituting the connection portions Z1 to Z3 and the lever member 37 rotate, the elongated holes 73, 74, 79 serving as guide portions constituting the connection portions Z1 to Z3 move, respectively. The second memory member 52 forms the link mechanism 70 moving the engagement portion 72 in the radial direction in conjunction with the lock operation and the unlock operation of the lock members 30.

As illustrated in FIG. 10, the lever member 37 rotates in the clockwise direction in FIG. 10 based on the operation input of the operation lever 13. Accordingly, the engagement portion 72 of the second memory member 52 disposed outward of the recliner 11 in the radial direction moves inwardly in the radial direction. At this time, the lock members 30 perform the unlock operation. In addition, the lever member 37 biased by the torsion coil spring 41 (see FIG. 6) rotates in the anticlockwise direction in FIG. 10 by the disconnection of the operation input by the operation lever 13. Accordingly, the second memory member 52 moves outwardly in the radial direction. At this time, the lock member 30 performs the lock operation. The engagement portion 72 operates a movement in the radial direction, the movement following the lock operation and unlock operation of the lock member 30, is performed across a position R1 in the radial direction where the circumferential wall portion 55 of the first memory member 51 is disposed.

Figure 11:
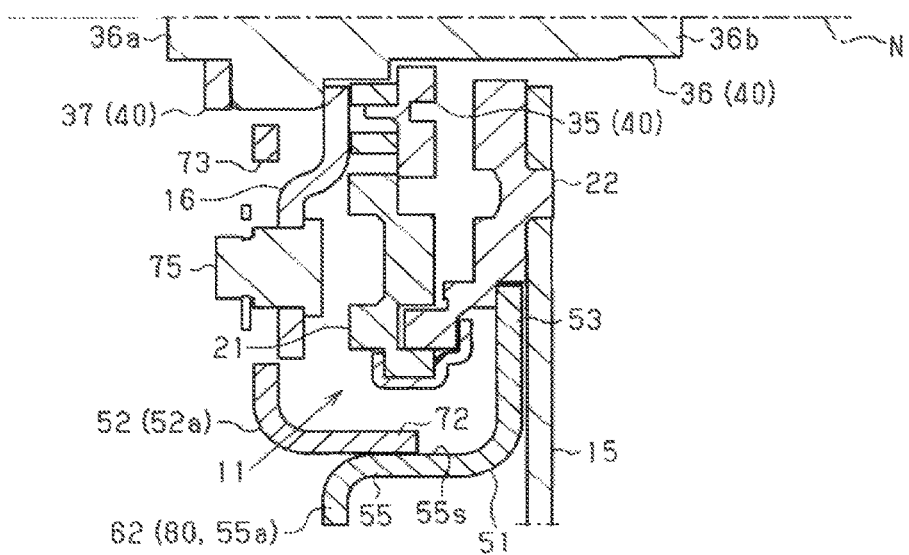
FIG. 11 is a cross section taken along a line XI-XI in FIG. 10.

As illustrated in FIGS. 2, 8, and 10, the engagement portion 72 of the second memory member 52 may move in the radial direction in conjunction with the lock operation and unlock operation of the lock member 30 in a case where the circumferential wall portion 55 of the first memory member 51 is disposed out of a range X in the circumferential direction. On the other hand, as illustrated in FIGS. 8, 10, and 11, in a case where the engagement portion 72 of the second memory member 52 is disposed within the range X in the circumferential direction, the engagement portion 72 is restricted from operating the movement in the radial direction, the movement following the lock operation of the lock member 30, as being in contact with an inner circumferential surface 55s of the circumferential wall portion 55. Accordingly, the recliner 11 may be retained in the unlock state without the retention of the operation input relative to the operation lever 13.

As illustrated in FIG. 10, in a case where the engagement portion 72 of the second memory member 52 moves inwardly in the radial direction in response to the operation input by the operation lever 13, each of the lock members 30 comes to be in the unlock state at the outer side of the position R1 in the radial direction where the circumferential wall portion 55 of the first memory member 51 is disposed. In a case where the first and second rotary members 21, 22 relatively rotate with each other, the engagement portion 72 of the second memory member 52 moving in the circumferential direction comes in contact with the flange portion 62 provided at the front end portion 55a in the circumferential direction of the circumferential wall portion 55 of the first memory member 51. That is, the engagement portion 72 of the second memory member 52 cannot enter into the range X in the circumferential direction in a case of being disposed outward relative to the position R1 in the radial direction. In other words, the seatback 3 is disposed at the first stage position P1 illustrated in FIG. 1 in a state where the engagement portion 72 of the second memory member 52 is in contact with the flange portion 62 of the first memory member 51 functioning as a rotation prevention portion 80.

As illustrated in FIGS. 1 and 2, when the seatback 3 is inclined rearward from the first stage position P1, the second memory member 52 integrally rotates with the first rotary member 21 fixed to the seatback 3 in the clockwise direction in FIG. 2. The circumferential wall portion 55 of the first memory member 51 is not provided in a range (left in FIG. 2, a range in a frontward circumferential direction) where the engagement portion 72 moves when the seatback 3 is inclined backward from the initial position P1. In this range in the circumferential direction, the second memory member 52 moves inward in the radial direction in conjunction with the unlock movement of the lock member 30 based on the operation input by the operation lever 13, and moves outward in the radial direction while following the lock operation of the lock member 30 by the stoppage of the operation input. The inclination angle of the seatback 3 may be freely adjusted in the inclination range from the initial position P1 to the maximum rear inclination position P2.

Meanwhile, in a case where the seatback 3 is inclined forward from the initial position P1, the second memory member 52 integrally rotates with the first rotary member 21 fixed to the seatback 3 in the anticlockwise direction in FIG. 2. The circumferential wall portion 55 of the first memory member 51 is provided in the range (right in FIG. 2, the range in the rear circumferential direction) where the engagement portion 72 moves when the seatback 3 is inclined forward from the initial position P1. In the range X in the circumferential direction (see FIG. 8), the engagement portion 72 of the second memory portion 52 comes in contact with the circumferential wall portion 55 of the first memory member 51 when moving outward in the radial direction by the stoppage of the operation input by the operation lever 13.

As such, the engagement portion 72 is restricted from operating the movement in the radial direction, the movement following the lock operation of the lock members 30, based on the engagement of the circumferential wall portion 55 of the first memory member 51 and the engagement portion 72 of the second memory member 52. Accordingly, the recliner 11 may be retained in the unlock state without the maintenance of the operation input by the operation lever 13 in the inclination range from the initial position P1 to the maximum forward inclination position P3.

Here, the operation shaft 36 is biased in the direction where the lock members 30 perform the lock operation based on the elasticity of the torsion coil spring 41. Accordingly, the second memory member 52 connected to the lever member 37 which integrally rotates with the operation shaft 36 is biased in the direction where the engagement portion 72 moves in the radial outward direction based on the elasticity of the torsion coil spring 41. Accordingly, the engagement portion 72 of the second memory member 52 frictionally engages with the inner circumferential surface 55s of the circumferential wall portion 55 while being pressed to the circumferential wall portion 55 of the first memory member 52 based on the biasing force of the torsion coil spring 41.

That is, in a state where the engagement portion 72 of the second memory member 52 is pressed to the circumferential wall portion 55 of the first memory member 51, the first and second rotary members 21, 22 relatively rotate with each other. Accordingly, the first memory member 51 integrally rotates with the second memory member 52 and the first rotary member 21. Accordingly, the rotary position of the first memory member 51 relative to the second rotary member 22 is displaced within the rotation limit range by the rotation limiting mechanism 60.

In a case where the rotation limiting mechanism 60 restricts the first memory member 51 from integrally rotating with the first rotary member 21, the first memory member 51 allows the engagement portion 72 to slide along the longitudinal direction of the circumferential wall portion 55. Accordingly, the engagement portion 72 of the second memory member 52 being pressed to the circumferential wall portion 55 of the first memory member 51 moves towards the front end 55a of the circumferential wall portion 55 and is separated from the circumferential wall portion 55 in accordance with the relative rotation of the first and second rotary members 21, 22. That is, in a case where the engagement of the circumferential wall portion 55 of the first memory member 51 and the engagement portion 72 of the second memory member 52 is released, the engagement portion 72 may operate the movement in the radial direction, the movement following the lock movement of the lock members 30.

Figure 12:
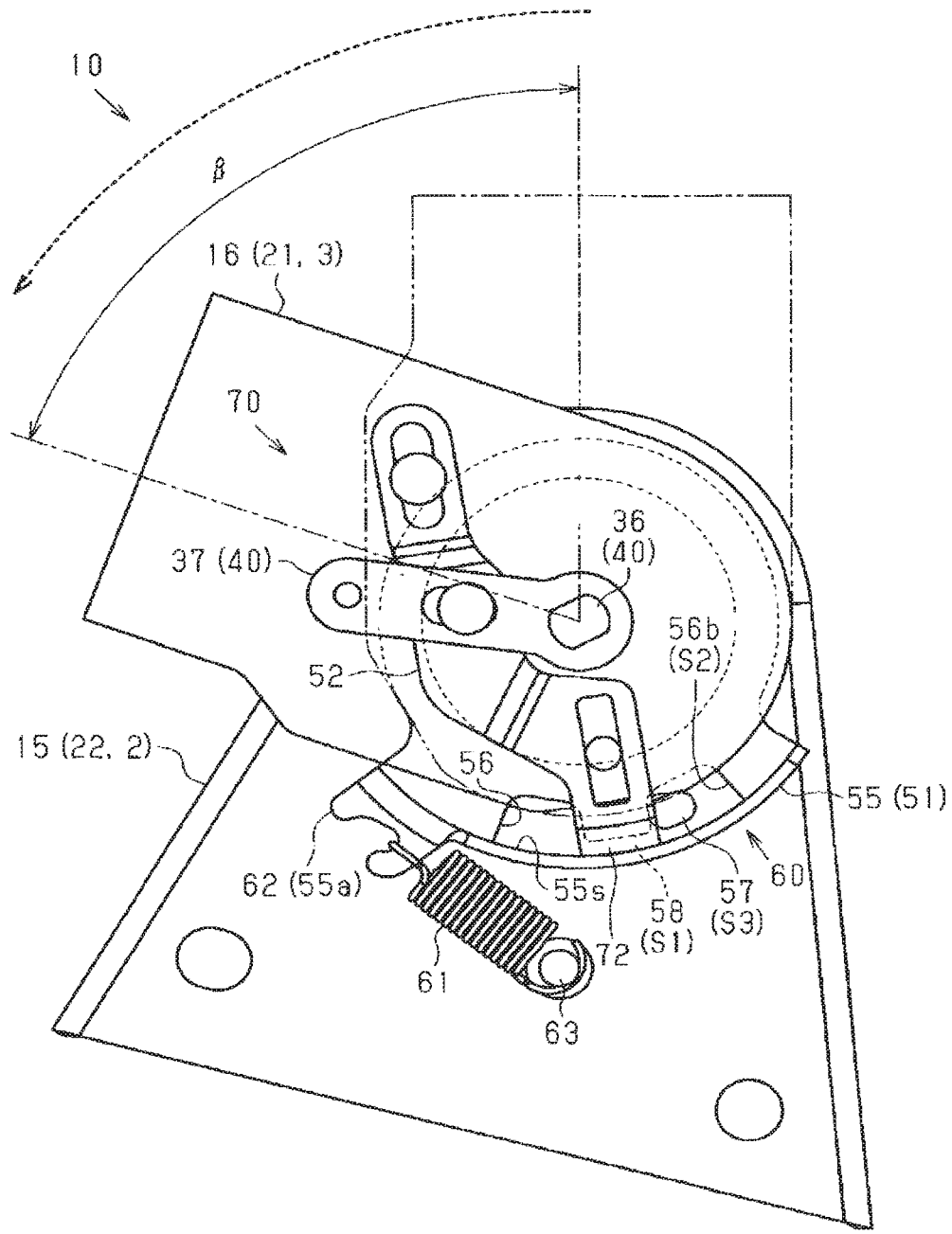
FIG. 12 is a side view of the seat reclining apparatus in which the seatback is disposed at a maximum forward inclination position when the forward inclination operation is performed.

As illustrated in FIGS. 1 and 12, in a case where the seatback 3 performs the forward inclination operation beyond the initial position P1, the second memory 52 rotates with the first rotary member 21 fixed to the seatback 3 in the anticlockwise direction in FIG. 12. At this time, the engagement portion 72 is pressed to the inner circumferential surface 55s of the circumferential wall portion 55 of the first memory member 51 based on the biasing force of the torsion coil spring 41 (see FIG. 11).

However, at this time, the first memory member 51 is retained at the first rotary position Q1 of the rotation limit range based on the biasing force of the stretching coil spring 61 (see FIG. 8), the first rotary position Q1 where the rotation limiting mechanism 60 restricts the first memory member 51 from rotating integrally with the first rotary member 21 when the seatback 3 performs the forward inclination operation. That is, since the engagement protrusion 58 of the first memory member 51 and the restricting protrusion 57 of the second rotary member 22 come in contact with each other, the first memory member 51 is restricted from rotating in the anticlockwise direction in FIG. 12 with respect to the second rotary member 22. Accordingly, the engagement portion 72 of the second memory member 52 slides on the inner circumferential surface 55s of the circumferential wall portion 55 against the frictional engagement force generated between the engagement portion 72 of the second memory member 52 and the circumferential wall portion 55 of the first memory member 51. As such, the seatback 3 performs the forward inclination operation until reaching the maximum inclination position P3 by the relative rotation of the first and second rotary members 21, 22 by a relative angle β while the first memory member 51 is retained in the first rotary position Q1.

Figure 13:
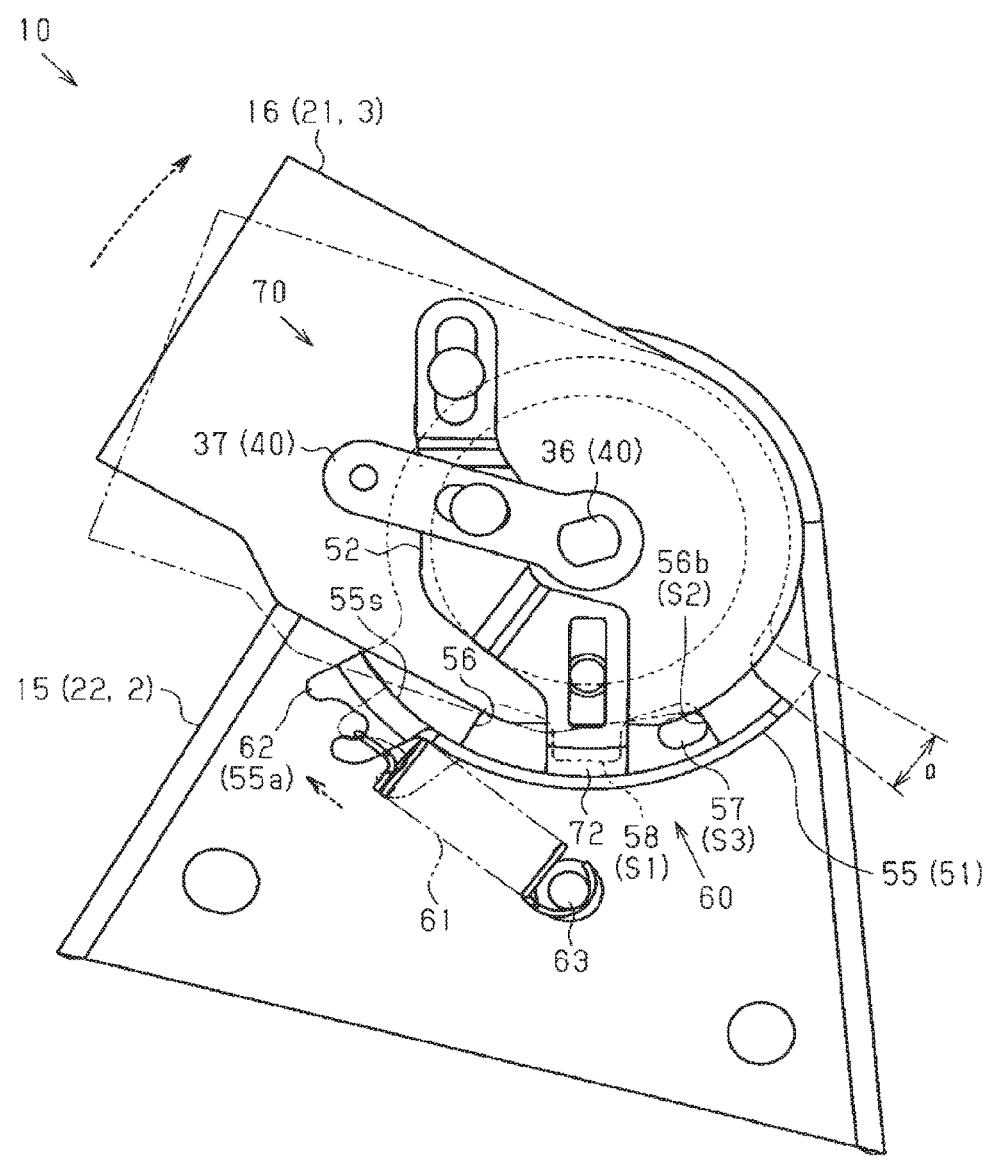
FIG. 13 is a side view of the seat reclining apparatus when a pulling up operation is started.

Meanwhile, as illustrated in FIGS. 1 and 13, in a case where the seatback 3 is pulled up from the maximum forward inclination position P3, the second memory member 52 rotates with the first rotary member 21 fixed to the seatback 3 in the clockwise direction in FIG. 13. When the pulling up operation is started, the first memory member 51 integrally rotates with the second memory member 52 and the first rotary member 21 based on the frictional engagement force generated between the first memory member 51 and the engagement portion 72 pressed to the circumferential wall portion 55.

That is, the first memory member 51 is retained in the first rotary position Q1 of the rotation limit range by the rotation limiting mechanism 60, that is, the first rotary position Q1 where the first rotation restricting portion S1 provided at the first memory member 51 and the third rotation restricting portion S3 provided at the second rotary member 22 come in contact with each other before the start of the pulling up operation. Accordingly, when the seatback 3 performs the pulling up operation in which the first and second rotary members 21, 22 relatively rotate in a reverse direction, the first memory member 51 may rotate relative to the second rotary member 22 up to the second rotary position Q2 of the rotation limit range by the rotation limiting mechanism 60.

That is, when the pulling up operation is started, the first memory member 51 rotates relative to the second rotary member 22 only by a predetermined relative angle α corresponding to the rotation limit range of the rotation limiting mechanism 60. The first memory member 51 integrally rotates with the first rotary member 21 against the biasing force of the stretching coil spring 61 in the clockwise direction in FIG. 13 until the second rotation restricting portion S2 (the rear end 56b of the elongated hole 56) comes in contact with the third rotation restricting portion S3 that is provided at a side where the second rotary member 22 is provided. During the continuation of the pulling up operation, the rotary position of the first memory member 51 relative to the second rotary member 22 is retained at the second rotary position Q2 where the second rotation restricting portion S2 and the third rotation restricting portion S3 come in contact with each other.

After the rotary position of the first memory member 51 relative to the second rotary member 22 is displaced, similarly to the forward inclination operation, the engagement portion 72 of the second memory member 52 pressed to the circumferential wall portion 55 of the first rotary member 21 slides on the inner circumferential surface 55s of the circumferential wall 55 against the frictional engagement force. Accordingly, the relative rotation of the first and second rotary members 21, 22 are allowed. In this state, since the first and second rotary members 21, 22 relatively rotate with each other while the seatback 3 is pulled up only by the relative angle 3 generated when the seatback 3 performs the forward inclination operation, the engagement of the first memory member 51 and the second memory member 52 is released.

That is, since the rotary position of the first memory member 51 relative to the second rotary member 22 is displaced when the pulling up operation is started, the timing in which the engagement portion 72 of the second memory member 52 separates from the circumferential wall portion 55 of the first memory member 51 delays. Accordingly, the recliner 11 is returned from the unlock state to the lock state at the basic position P0 that is the rear of the initial position P1 where the first memory member 51 and the second memory member 52 start engaging with each other in the forward inclination operation.

Figure 14:
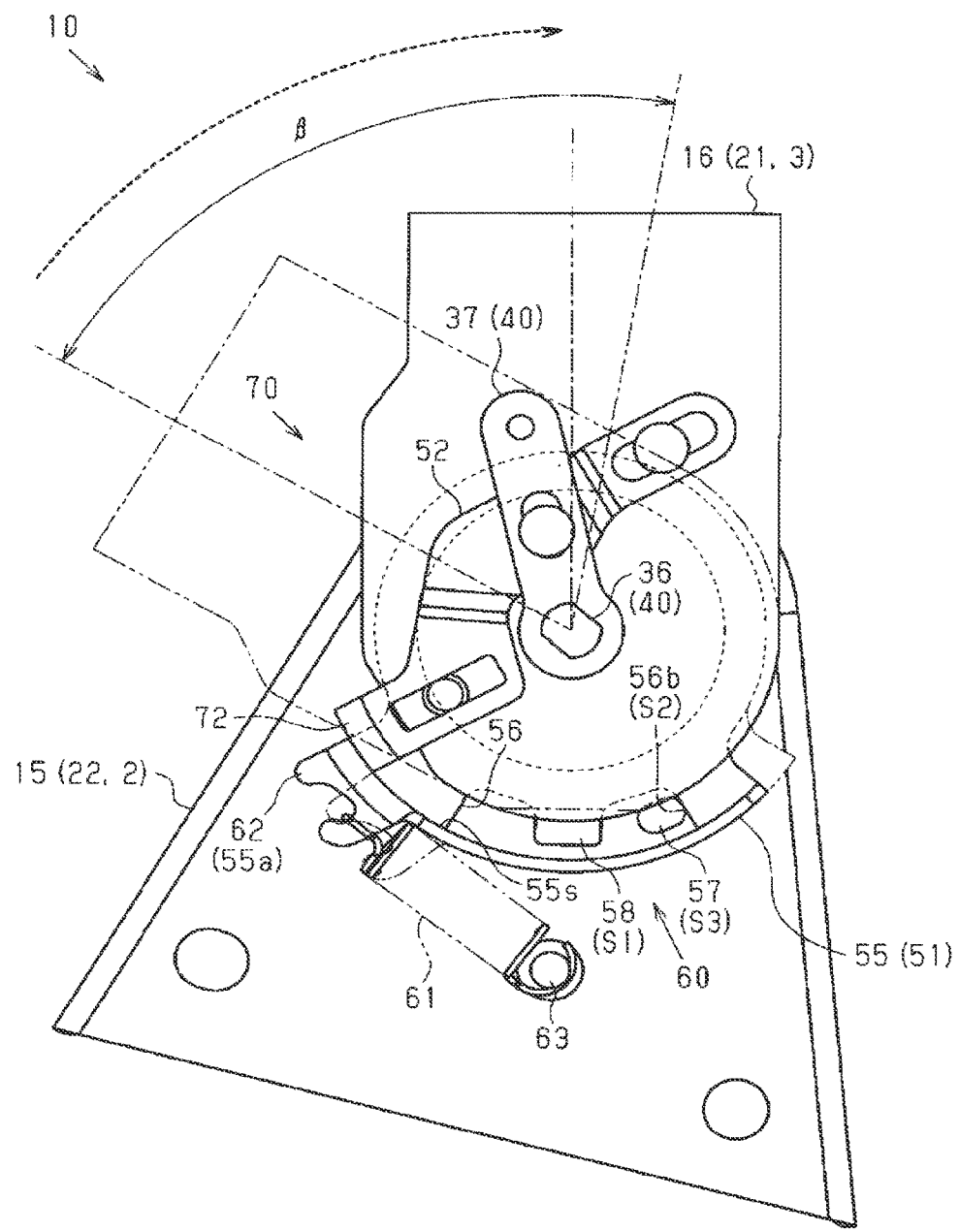
FIG. 14 is a side view of the seat reclining apparatus in which the seatback is disposed at the first stage position.

As illustrated in FIGS. 1 and 14, at a time point when the seatback 3 reaches the first stage position P1 by the pulling up operation, that is, in a state where the seatback 3 is pulled up to an engagement start position by the forward inclination operation, the engagement portion 72 of the second memory member 52 is pressed to the circumferential wall portion 55 of the first memory member 51.

Figure 15:
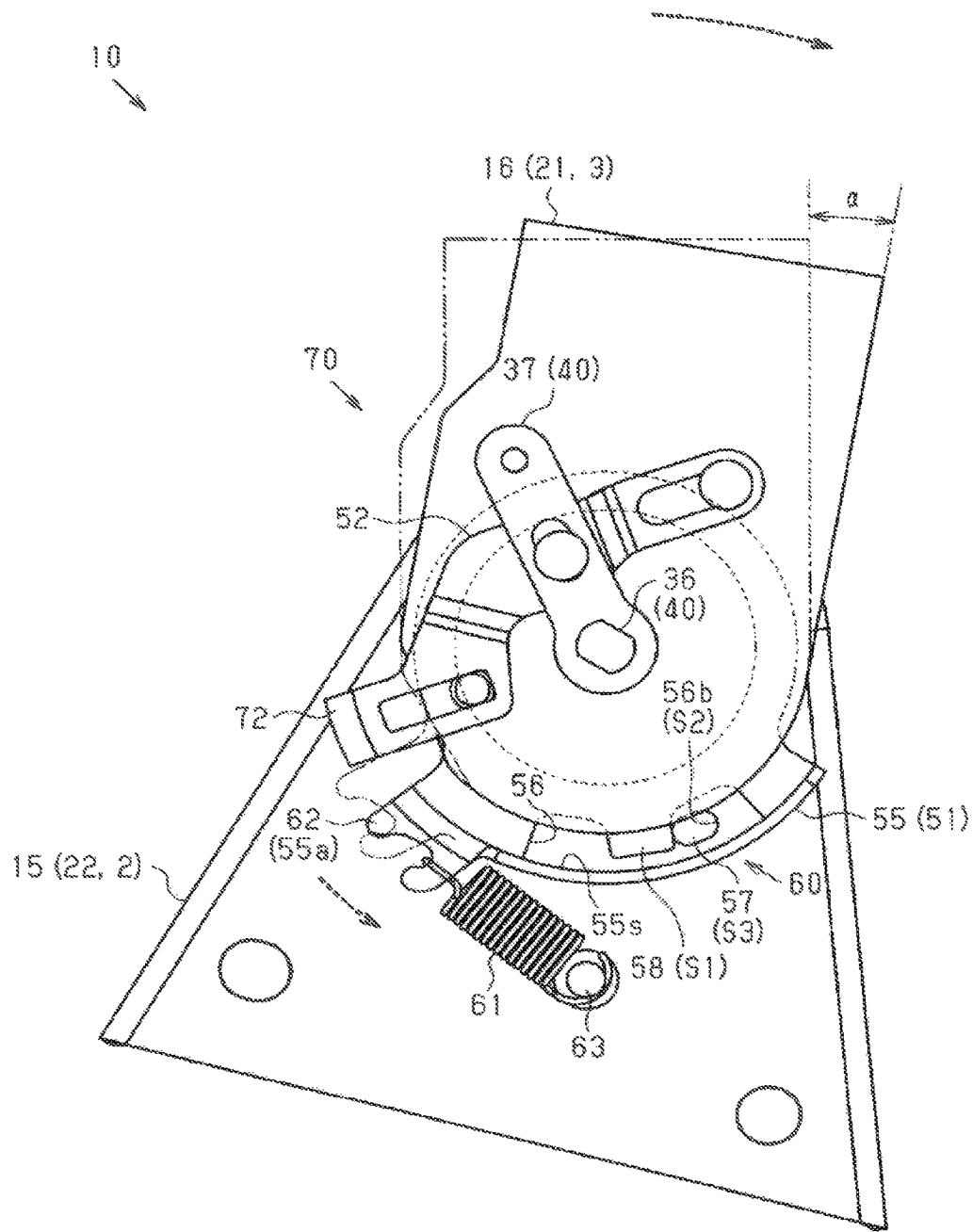
FIG. 15 is a side view of the seat reclining apparatus in which the seatback is returned to a basic position.

FIGS. 1 and 15 illustrate a state where the first and second rotary members 21, 22 relatively rotate with each other to pull up the seatback 3 only by the relative angle α corresponding to the rotation limit range by the rotation limiting mechanism 60 from a state illustrated in FIG. 14. In this state, the engagement portion 72 of the second memory member 52 being in contact with the circumferential wall portion 55 of the first memory member 51 moves to the front end 55a where the engagement portion 72 is separable from the circumferential wall portion 55. Then, the engagement portion 72 of the second memory member 52 moves in the radially inward direction while following the lock movement of the lock member 30. As such, the recliner 11 is returned to the lock state and at the same time, the seatback 3 being forwardly inclined is returned to the basic position P0.

In other words, the inclination angle θ1 from the basic position P0 to the initial position P1 matches the relative angle α corresponding to the rotation limit range by the rotation limiting mechanism 60, that is, matches the variance of the rotary position of the first memory member 51 with respect to the second rotary member 22 that is generated since the first and second rotary members 21, 22 relatively rotate with each other in the reverse direction when the pulling up operation is started. The seatback 3 may return to the basic position P0 irrespective of the inclination angle before the forward inclination operation based on the pulling up operation of the seatback 3.

Since the engagement portion 72 of the second memory member 52 is separated from the circumferential wall portion 55 of the first memory member 51, the first memory member 51 rotates in the anticlockwise direction in FIG. 15 based on the biasing force of the stretching coil spring 61. Accordingly, the variance (the relative angle α) of the rotary position of the first memory member 51 with respect to the second rotary member 22 generated since the first and second rotary members 21, 22 relatively rotate with each other in the reverse direction when the pulling up operation is started is returned. That is, the first memory member 51 is returned to the first rotary position Q1 of the rotation limit range where the first memory member 51 and the first rotary member 21 are restricted from integrally rotating with each other by the rotation limiting mechanism 60 when the forward inclination operation is performed.

As described above, according to the present embodiment, effects described below may be obtained.

(1) The seat reclining apparatus 10 includes the first memory member 51 and the second memory member 52. The first memory member 51 is coaxially provided on the first and second rotary members 21, 22 with which the recliner 11 is comprised so as to be rotatable. The second memory 52 integrally rotates with the first rotary member 21 while connecting the lock members 30 of the recliner 11 to the operation mechanism 40 locking and unlocking the lock members 30. The first memory member 51 is provided with the circumferential wall portion 55 serving as a first engagement portion extending in the circumferential direction. The second memory member 52 is provided with the engagement portion 72 serving as a second engagement portion moving in the radial direction in conjunction with the lock operation and the unlock operation of the lock members 30. Furthermore, the seat reclining apparatus 10 includes the rotation limiting mechanism 60 limiting the relative rotary range of the first memory member 51 with respect to the second rotary member 22. In addition, since the circumferential wall portion 55 of the first memory member 51 comes in contact with the engagement portion 72 of the second memory member 52, the engagement portion 72 is restricted from operating the movement in the radial direction, the movement following the lock operation of the lock member 30, and at the same time, since the engagement portion 72 of the second memory member 52 and the circumferential wall portion 55 engage with each other, the first memory member 51 integrally rotates with the first rotary member 21. In a state where the rotation limiting mechanism 60 restricts the first memory member 51 from integrally rotating with the first rotary member 21, the engagement portion 72 is allowed to slide along the longitudinal direction of the circumferential wall portion 55 of the first memory member 51.

According to the aforementioned configuration, the engagement portion 72 of the second memory member 52 moves in the circumferential direction with respect to the circumferential wall portion 55 of the first memory member 51 based on the relative rotation of the first and second rotary members 21, 22. In addition, in a case where the engagement portion 72 is disposed within the range X of the circumferential direction where the circumferential wall portion 55 is provided, the lock members 30 retain in the unlock state by the engagement of the engagement portion 72 with the circumferential wall portion 55. Furthermore, since the engagement portion 72 is separated from the front end 55a of the circumferential wall portion 55 in accordance with the relative rotation of the first and second rotary members 21, 22, the lock members 30 is returned to the lock state. As such, the single operation system may adjust the inclination angle of the seatback 3 and may return the seatback 3 to a preset inclination position (a fixed point) by the pulling up operation.

Furthermore, since the first and second rotary members 21, 22 relatively rotate with each other in the reverse direction in a state where the circumferential wall portion 55 of the first memory member 51 and the engagement portion 72 of the second memory member 52 engage with each other, the rotary position of the first memory member 51 relative to the second rotary member 22 is displaced only by a predetermined relative angle α corresponding to the rotation limit range of the rotation limiting mechanism 60. Accordingly, the timing in which the engagement portion 72 of the memory member 52 is separated from the circumferential portion 55 of the first memory member 51 may delay. Accordingly, the lock member 30 may return to the lock state by defining the inclination position (the basic position P0) that is disposed rear of the inclination position (the initial position P1) where the maintenance of the unlock state is started by the forward inclination operation of the seatback 3 as the fixed point.

Further, the inclination angle θ1 from the basic position P0 to the initial position P1 matches the relative angle α corresponding to the rotation limit range by the rotation limiting mechanism 60, that is, matches the variance of the rotary position of the first memory member 51 relative to the second rotary member 22 generated since the first and second rotary members 21, 22 relatively rotate with each other in the reverse direction when the pulling up operation is started. That is, the timing in which the lock members 30 return to the lock state may be adjusted based on the rotation limit range by the rotation limiting mechanism 60. Accordingly, the return position of the seatback 3 by the pulling up operation may be freely set.

In addition, the inclination angle 81 from the basic position P0 to the initial position P1 may be determined by the rotation limit range by the rotation limiting mechanism 60. Accordingly, the engagement force between the circumferential wall portion 55 of the first memory member 51 and the engagement portion 72 of the second memory member 52 does not have to be managed strictly. Thus, the manufacturing error or the assembling error may be easily managed, and the manufacturing cost may be reduced.

(2) The operation mechanism 40 includes the torsion coil spring 41 serving as a biasing member biasing the lock members 30 in the direction locking the lock member 30. The engagement portion 72 of the second memory member 52 frictionally engages with the circumferential wall portion 55 by being pressed to the circumferential wall portion 55 of the first memory member 51 based on the biasing force of the torsion coil spring 41. According to the aforementioned configuration, the first memory member 51 may integrally rotate with the second memory member 52 and the first rotary member 21 with a simple configuration. Furthermore, in a state where the rotation limiting mechanism 60 restricts the first memory member 51 from integrally rotating with the first rotary member 21, the engagement portion 72 may smoothly slides on the first memory member 51 in the longitudinal direction of the circumferential wall portion 55.

(3) The seat reclining apparatus 10 includes the stretching coil spring 61 serving as a biasing member biasing the first memory member 51. According to the aforementioned configuration, after the engagement portion 72 of the second memory member 52 is separated from the circumferential wall portion 55 of the first memory member 51, the variance of the rotary position of the first memory member 51 relative to the second rotary member 22 generated since the first and second rotary members 21, 22 relatively rotate with each other in the reverse direction in accordance with the pulling up operation may be recovered. Accordingly, after the seatback 3 is returned to the basic position P0 by the pulling up operation, the inclination angle of the seatback 3 may speedily return to the adjustable state up to the initial position P1 that is forward of the basic position P0.

(4) The first memory member 51 includes the flange portion 62 extending in the outward radial direction from the front end 55a of the circumferential wall portion 55. In addition, in a case where the engagement portion 72 of the second memory member 52 is disposed outward in the radial direction relative to the position R1 in the radial direction where the circumferential wall portion 55 is disposed, that is, in the lock direction where the lock members 30 performs the lock operation, the flange portion 62 comes in contact with the engagement portion 72 in the circumferential direction. In this case, since the flange portion 62 functions as the rotation prevention portion 80, the engagement portion 72 disposed outward relative to the position R1 in the radial direction may be restricted from entering into the range X in the circumferential direction where the circumferential wall portion 55 is provided. Accordingly, in a case where the engagement portion 72 is disposed within the range X in the circumferential direction, the lock members 30 may be prevented from being retained in the lock state.

(5) The elongated hole 56 extending in the circumferential direction is formed at the first memory member 51. In addition, the first memory member 51 includes the engagement protrusion 58 protruding toward the elongated hole 56. The support plate 15 to which the second rotary member 22 is fixed includes the restriction protrusion 57 being inserted into the elongated hole 56. According to the aforementioned configuration, the rotation limiting mechanism 60 limiting the rotary range of the first memory member 51 with respect to the second rotary member 22 between the first rotary position Q1 where the engagement protrusion 58 comes in contact with the restricting protrusion 57 and the second rotary position Q2 where the rear end 56b of the elongated hole 56 comes in contact with the restricting protrusion 57 is formed in a simple configuration. In addition, a distance in which the third rotation restricting portion S3 is movable within the elongated hole 56, that is, a distance in which the first memory member 51 is rotatable relative to the second rotary member 22 may be easily adjusted based on an interval between the engagement protrusion 58 serving as the first rotary restricting portion S1 and the rear end 56b of the elongated hole 56 serving as the second rotary restricting portion S2.

(6) The seat reclining apparatus 10 includes the first memory member 51 including the circumferential wall portion 55, and the second memory member 52 integrally rotating with the first rotary member 21. The second memory member 52 includes the engagement portion 72 moving in the circumferential direction relative to the circumferential wall portion 55 by integrally rotating with the first rotary member 21. The second memory member 52 is connected to the lever member 37 that is coaxially provided on the first and second rotary members 22, 23. Accordingly, the second memory member 52 is formed with the link mechanism 70 moving the engagement portion 72 in the radial direction in conjunction with the lock and unlock operations of the lock members 30. In addition, since the engagement portion 72 of the second memory member 52 comes in contact with circumferential wall portion 55 of the first memory member 51, the engagement portion 72 is restricted from operating the movement in the radial direction, the movement following the lock operation of the lock members 30. Furthermore, the link mechanism 70 includes the first and second connection portions Z1, Z2 connecting the second memory member 52 to the seatback side member 16 serving as a retention member, and the third connection member Z3 connecting the second memory member 52 to the lever member 37. Further, the first and second connection portions Z1, Z2 are configured with the elongated holes 73, 74, serving as guide portions extending along the two straight lines L1, L2 that are in parallel with each other, and the connection pins 75, 76, serving as the guide engagement portions movable in the elongated hole 73, 74, respectively. According to the aforementioned configuration, the engagement portion 72 of the second memory member 52 may move more straightforwardly. Accordingly, the engagement portion 72 separated from the circumferential wall portion 55 of the first memory member 51 may move speedily in the radially inward direction serving as the lock direction. As a result, the lock members 30 may be locked in a more accurate timing.

Furthermore, the design flexibility of the link mechanism 70 is enhanced by the disposition of the connection portions Z1 to Z3. Accordingly, the greater moving amount of the engagement portion 72 may be secured while inhibiting the setting space from increasing. As a result, the lock members 30 may further securely return to the lock state by retaining the lock member 30 in the unlock state or by releasing the lock member 30 from the engaged state based on the engagement relationship between the circumferential wall portion 55 of the first memory member 51 and the engagement portion 72 of the second memory member 52.

Further, the highly-reliable link mechanism 70 may be formed in a simple configuration by defining the elongated holes 73, 74 of the second memory member 52 as guide portions and defining the shaft-shaped connection pins 75, 76 provided at the seatback side member 16 as the guide engagement portion.

(7) The second memory member 52 is disposed such that the longitudinal direction of the elongated hole 73 matches the straight line L1 passing through the rotary shaft N of the first and second rotary members 21, 22 and such that the engagement portion 72 moves in the radial direction along the straight line L1. Accordingly, the engagement portion 72 of the second memory member 52 separated from the circumferential wall portion 55 of the first memory member 51 may further speedily moves in the lock direction.

(8) The elongated holes 73, 74 constituting the first and second connection portions Z1, Z2 are formed at the first end portion 52a and the second end portion 52b of the second memory member 52, respectively. In addition, the connection pin 77 constituting the third connection portion Z3 is provided at an intermediate position between the elongated holes 73, 74. According to this configuration, the moving amount of the engagement portion 72 may be secured more largely, and more effectively while inhibiting the setting space from increasing.

(9) The first memory member 51 is coaxially provided on the first and second rotary members 21, 22 so as to be rotatable. The seat reclining apparatus 10 includes the rotation limiting mechanism limiting the rotary range of the first memory member 51 relative to the second rotary member 22. By the engagement of the circumferential wall portion 55 of the first memory member 51 with the engagement portion 72 of the second memory member 52, the first memory member 51 integrally rotates with the first rotary member 21 and allows the engagement portion 72 to slide along the circumferential wall portion 55 in a state where the first memory member 51 is restricted from integrally rotating with the first rotary member 21 by the rotation limiting mechanism 60.

According to the aforementioned configuration, the single operation system may adjust the inclination angle of the seatback 3, and may return the seatback 3 to the preset inclination position (the fixed point) by the pulling up operation. In addition, since the first and second rotary members 21, 22 relatively rotate with each other in the reverse direction in a state where the circumferential wall portion 55 of the first memory member 51 and the engagement portion 72 of the second memory member 52 engage with each other, the rotary position of the first memory member 51 relative to the second rotary member 22 is displaced by the relative angle α corresponding to the rotation limit range of the rotation limiting mechanism 60. Accordingly, the timing in which the engagement portion 72 of the second memory member 52 is released from the circumferential wall portion 55 of the first memory member 51 may delay. Thus, the lock members 30 may return to the lock state by identifying the inclination position (the basic position P0) that is rear of the inclination position (the initial position P1) where the retention of the unlock state is started by the forward inclination operation of the seatback 3 as the fixed point.

Further, the inclination angle θ1 from the basic position P0 to the initial position P1 matches the relative angle α corresponding to the rotation limit range by the rotation limiting mechanism 60, that is, matches the variance of the rotary position of the first memory member 51 relative to the second rotary member 22 generated since the first and second rotary members 21, 22 relatively rotate with each other in the reverse direction when the pulling up operation is started. That is, the timing in which the lock members 30 return to the lock state may be adjusted based on the rotation limit range by the rotation limiting mechanism 60. Accordingly, the return position of the seatback 3 by the pulling up operation may be freely set.

In addition, the inclination angle θ1 from the basic position P0 to the initial position P1 is determined by the rotation limit range by the rotation limiting mechanism 60. Accordingly, the engagement force between the circumferential wall portion 55 of the first memory member 51 and the engagement portion 72 of the second memory member 52 does not have to be managed strictly. Thus, the manufacturing error or the assembling error may be easily managed, and the manufacturing cost may be reduced.

The aforementioned embodiment may be changed as below. The configuration of the recliner may be freely changed as long as the first and second rotary members that are coaxially disposed and the lock member that can restrict the relative rotation of the first and second rotary members in conjunction with the operation mechanism are provided. For example, the configuration in which the lock members 30 are retained at the first rotary member 21, and the inner teeth 33 are formed at the circumferential wall portion 24 of the second rotary member 22 may be changed to a configuration in which the lock members 30 are retained at the second rotary member 22, and the inner teeth 33 are formed at the circumferential wall portion 23 of the first rotary member 21.

A configuration in which the first rotary member 21 is fixed to the seatback 3, and the second rotary member 22 is fixed to the seat cushion 2 may be changed to a configuration in which the first rotary member 21 is fixed to the seat cushion 2, and the second rotary member 22 is fixed to the seatback 3.

A configuration of the operation mechanism 40 locking and unlocking the lock members 30 based on the operation input by the operation lever 13 provided at an upper end of the seatback 3 may be freely changed. For example, a foot-lever type lever may be adapted as the operation lever 13, and the disposition and the shape of the lever may be freely changed.

A configuration in which the link mechanism 70 is formed by the connection of the second memory member 52 to the lever member 37, and the engagement portion 72 of the second memory member 52 moves in the radially outward direction in conjunction with the lock operation of the lock members 30 and moves in the radially inward direction in conjunction with the unlock operation of the lock member 30 may be changed to a configuration in which the second memory member 52 moves in the radially inward direction in conjunction with the lock operation of the lock members 30 and moves in the radially outward direction in conjunction with the unlock operation of the lock members 30. That is, a configuration in which the engagement portion 72 of the second memory member 52 comes in contact with the outer circumferential surface of the circumferential wall portion 55 of the first memory member 51 may be adapted.

The position of the first memory member 51 may be freely changed to a position other than the outer circumference of the second rotary member 22 as long as the first memory member 51 is coaxially provided with the first and second rotary members 21, 22 so as to be rotatable. The shapes of the first memory member 51 and the second memory member 52 may be freely changed. For example, the fitting portion 53 of the first memory member 51 may be formed in a C-ring shape or an E-ring shape other than the ring shape.

The configuration in which the first engagement portion is formed at the circumferential wall portion 55 of the first memory member 51, and the engagement portion 72 (the second engagement portion) of the second memory member 52 comes in contact with the inner circumferential surface 55s of the circumferential wall portion 55 may be changed to a configuration in which an elongated hole extending in the circumferential direction is formed and the second engagement portion comes in contact with an inner wall surface of the elongated hole.

The configuration in which the engagement portion 72 of the second memory member 52 is frictionally engaged with the circumferential wall portion 55 of the first memory member 51 by being pressed therefrom based on the biasing force of the torsion coil spring 41 may be changed as follows. That is, the engagement relationship between the engagement portions does not have to be established by the friction as long as the second engagement portion is slidable in the longitudinal direction of the first engagement portion against the engagement force in a state where the first memory member 51 integrally rotates with and is restricted from integrally rotating with the second memory member 52 and the first rotary member 21 based on the engagement force of the first engagement portion and the second engagement portion.

The biasing member biasing the first memory member 51 may be omitted from the configuration in which the first memory member 51 is retained at the first rotary position Q1 of the rotation limit range where the rotation limiting mechanism 60 restricts the first memory member 51 from integrally rotating with the first rotary member 21 when the forward inclination operation is performed by being biased by the stretching coil spring 61 serving as a biasing member.

According to the aforementioned embodiment, the rotation limiting mechanism 60 is formed such that the restricting protrusion 57 of the support plate 15 to which the second rotary member 22 is fixed is inserted into the elongated hole 56 of the first memory member 51. In addition, the rotary range of the first memory member 51 is limited in the range where the restricting protrusion 57 is movable by having the engagement protrusion 58 being formed at the first memory member 51 and protruding within the elongated hole 56, and the rear end 56*b* of the elongated hole 56 as the first and second rotary restricting portions S1, S2, respectively, and by having the restricting protrusion 57 as the third rotary restricting portion S3 that is provided between the first and second rotary restring portions S1, S2.

However, the configuration of the rotation limiting mechanism 60 may be freely changed. For example, the front end 56*a* of the elongated hole 56 and the engagement protrusion 58 may serve as the first and second rotary restricting portions S1, S2, respectively. Furthermore, the rotation limiting mechanism 60 may be configured such that plural engagement protrusions protruding within the elongated hole 56 are formed, and the positions of the first and second rotary restricting portions S1, S2 are changeable by using the engagement protrusions, that is, the rotation limit range (the relative angle α) of the first memory member 51 is adjustable.

A recessed portion corresponding to the elongated hole 56 may be formed at the second rotary member 22, and a protrusion corresponding to the engagement protrusion 58 may be provided at the first memory member. The first to third rotary restrictions S1 to S3 may be formed of protrusions.

The configuration in which the first and second connection portions Z1, Z2 connecting the seatback side member 16 and the second memory member 52 by the insertion of the connection pins 75, 76 of the seatback side member 16 into the elongated holes 73, 74 of the second memory member 52 may be changed as follows. For example, recessed portions that serve as guide portions and that correspond to the elongated holes 73, 74 may be formed at a retention member of the first rotary member 21, and engagement protrusions that correspond to the connection pins 75, 76 and that serve as guide engagement portions may be formed at the second memory member 52. In addition, a guide portion that constitutes one of the first and second connection portions Z1, Z2, and a guide engagement portion that constitutes the other of the first and second connection portions Z1, Z2 may be formed at the second memory member 52. The guide portion may be a ridge portion other than a recessed portion.

The connection pin 77 constituting the third connection Z3 is provided at the intermediate position between the elongated holes 73, 74 constituting the first and second connection portions Z1, Z2, however, the position of the third connection portion Z3 formed at the second memory member 52 may be freely changed.

The seatback side member 16 to which the first rotary member 21 is fixed, the seatback side member 16 serving as the retention member provided at a side where the first rotary member 21 is disposed, may be freely changed as long as the retention member integrally rotates with the first rotary member 21. Alternatively, the first rotary member 21 itself may be the retention member.

The first straight line L1 extending in the same direction as the guide portion (the elongated hole 73) constituting the first connection portion Z1 and the second straight line L2 extending in the same direction as the guide portion (the elongated hole 74) constituting the second connection portion Z2 do not have to be in parallel with each other.

The guide portions constituting the first and second connection portions Z1, Z2 may, for example, extend along a curve line instead of extending in the straight line. The guide portions constituting the first and second connection portions Z1, Z2 may be formed such that, for example, one of the first and second connection portions Z1, Z2 may be formed in an elongated-hole shape, and the other of the first and second connection portions Z1, Z2 may be formed in a circular-hole shape. In other words, at least one of the guide portions have only to include a guide surface guiding a guide engagement portion in a moving direction thereof.

The invention claimed is:

1. A seat reclining apparatus for a vehicle comprising:
   a first rotary member;
   a second rotary member being coaxially disposed on the first rotary member so as to be relatively movable therewith;
   a lock member restricting the first rotary member and the second rotary member from relatively rotating with each other;
   an operation mechanism locking and unlocking the lock member;
   a first memory member being coaxially provided with the first rotary member and the second rotary member so as to be rotatable therewith;
   a second memory member integrally rotating with the first rotary member in a state of being connected to the operation mechanism; and
   a rotation limiting mechanism limiting a rotary range of the first memory member relative to the second rotary member, wherein
   the first memory member includes a first engagement portion extending in a circumferential direction of the first memory member,
   the second memory member includes a second engagement portion moving in conjunction with a lock operation and an unlock operation of the lock member,
   the first memory member restricts a movement of the second engagement portion, the movement that follows the lock operation of the lock member, by a contact of the first engagement portion and the second engagement portion,
   the first memory member integrally rotates with the first rotary member by an engagement of the second engagement portion being in contact with the first engagement portion, and
   in a state where the rotation limiting mechanism restricts the first memory member and the first rotary member from integrally rotating with each other, the first memory member allows the second engagement portion to slide along a longitudinal direction of the first engagement portion.

2. The seat reclining apparatus for the vehicle according to claim 1, wherein
the second engagement portion moves in a radial direction of the first rotary member and the second rotary member in conjunction with the lock operation and the unlock operation of the lock member, and
the first memory member restricts the movement of the second engagement portion in the radial direction, the movement following the lock operation of the lock member.

3. The seat reclining apparatus for the vehicle according to claim 1, wherein
the operation mechanism includes a biasing member biasing the lock member in a lock operation direction, and
the second engagement portion frictionally engages with the first engagement portion based on a biasing force of the biasing member.

4. The seat reclining apparatus for the vehicle according to claim 1, further comprising:
a biasing member biasing the first memory member to rotate the first memory member.

5. The seat reclining apparatus for the vehicle according to claim 1, further comprising:
a rotation prevention portion being provided at an end portion of the first engagement portion in the circumferential direction, wherein
in a case where the second engagement portion is disposed in a lock direction relative to a radial-direction position where the first engagement portion is disposed, the rotation prevention portion restricts the second engagement portion from entering into a circumferential-direction range where the first engagement portion is disposed by coming in contact with the second engagement portion in the circumferential direction.

6. The seat reclining apparatus for the vehicle according to claim 1, wherein
the rotation limiting mechanism includes
a first rotation restricting portion and a second rotation restricting portion being provided at one of a side where the first memory member is disposed and a side where the second rotary member is disposed, and
a third rotation restricting portion being provided at the other of the side where the first memory member is disposed and the side where the second rotary member side is disposed; and
the rotation limiting mechanism limits a relative rotation range of the first memory member relative to the second rotary member between a first rotary position and a second rotary position, the first rotary position where the third rotation restricting portion comes in contact with the first rotation restricting portion, the second rotary position where the third rotation restricting portion comes in contact with the second rotation restricting portion.

7. The seat reclining apparatus for the vehicle according to claim 1, further comprising:
a lever member locking and unlocking the lock member by coaxially rotating with the second rotary member, wherein
the second memory member constitutes a link mechanism moving the second engagement portion in conjunction with the lock operation and the unlock operation of the lock member by being connected to the lever member,
the link mechanism includes a first connection portion and a second connection portion connecting the second memory member and a retention member which is disposed at a side where the first rotary member is disposed, and a third connection portion connecting the second memory member and the lever member, and
the first connection portion and the second connection portion are configured with a guide portion corresponding to each of the first connection portion and the second connection portion, and a guide engagement portion being relatively movable with the guide portion by engaging therewith.

8. The seat reclining apparatus for the vehicle according to claim 7, wherein
the guide portion includes a first guide portion being provided at the first connection portion and a second guide portion being provided at the second connection portion, and
at least one of the first guide portion and the second guide portion includes a guide surface guiding the guide engagement portion in a moving direction thereof.

9. The seat reclining apparatus for the vehicle according to claim 8, wherein
the first guide portion extends along a first straight line,
the second guide portion extends along a second straight line, and
the guide engagement portion is movable in a longitudinal direction of the first guide portion and the second guide portion.

10. The seat reclining apparatus for the vehicle according to claim 9, wherein the first straight line and the second straight line are in parallel with each other.

11. The seat reclining apparatus for the vehicle according to claim 9, wherein the second memory member is configured such that a longitudinal direction of the guide portion of the first connection portion matches a straight line passing a rotary center of the first rotary member and the second rotary member, and the second engagement portion moves in a radial direction on the straight line.

12. The seat reclining apparatus for the vehicle according to claim 7, wherein
the first connection portion and the second connection portion are set at two positions that are spaced apart from each other, and
the third connection portion connects the second memory member and the lever member at a position between the first connection portion and the second connection portion.

13. The seat reclining apparatus for the vehicle according to claim 7, wherein
the guide portion corresponds to an elongated hole, and
the guide engagement portion corresponds to an engagement protrusion being inserted into the elongated hole.

14. The seat reclining apparatus for the vehicle according to claim 1, wherein the rotation limiting mechanism is configured such that a rotation limit range of the first memory member is adjustable.

* * * * *